US009437178B2

(12) United States Patent
Hiratsuka et al.

(10) Patent No.: US 9,437,178 B2
(45) Date of Patent: Sep. 6, 2016

(54) UPDATING MUSIC CONTENT OR PROGRAM TO USABLE STATE IN COOPERATION WITH EXTERNAL ELECTRONIC AUDIO APPARATUS

(71) Applicant: YAMAHA CORPORATION, Hamamatsu-shi, Shizuoka-ken (JP)

(72) Inventors: Satoshi Hiratsuka, Hamamatsu (JP); Shinya Hamaguchi, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 825 days.

(21) Appl. No.: 13/626,062

(22) Filed: Sep. 25, 2012

(65) Prior Publication Data

US 2013/0079910 A1 Mar. 28, 2013

(30) Foreign Application Priority Data

Sep. 25, 2011 (JP) ................................ 2011-208308
Jul. 13, 2012 (JP) ................................ 2012-157935

(51) Int. Cl.
*G06F 17/00* (2006.01)
*G10H 1/00* (2006.01)

(52) U.S. Cl.
CPC .......... *G10H 1/0008* (2013.01); *G10H 1/0066* (2013.01); *G10H 2220/015* (2013.01); *G10H 2240/026* (2013.01); *G10H 2240/115* (2013.01); *G10H 2240/171* (2013.01); *G10H 2240/181* (2013.01)

(58) Field of Classification Search
None
See application file for complete search history.

(56) References Cited

U.S. PATENT DOCUMENTS 6,907,113 B1 6/2005 Holm et al.
8,737,638 B2 5/2014 Sakurada et al.
2003/0061115 A1 3/2003 Wachi (Continued)

FOREIGN PATENT DOCUMENTS

EP 1443769 A2 1/2004
EP 2268057 A1 12/2010

(Continued)

OTHER PUBLICATIONS

Office Action issued in Japanese Appln. No. 2012-157935 mailed Mar. 29, 2016. English translation provided.

(Continued)

*Primary Examiner* — Fan Tsang
*Assistant Examiner* — David Siegel
(74) *Attorney, Agent, or Firm* — Rossi, Kimms & McDowell LLP

(57) ABSTRACT

A storage section stores therein one or more sets of music content and/or function executing programs, at least a part of the sets of music content and/or function executing programs being set in a non-usable state at least in an initial state. An audio signal containing additional information is received from an external electronic audio apparatus, and a determination is made as to whether the additional information satisfies a predetermined condition. If the additional information satisfies the predetermined condition, any of the sets of music content and/or function executing programs, stored in the storage section, that is currently set in the non-usable state is updated to a usable state. A model of the external electronic audio apparatus is identified, and any of the sets of music content and/or function executing programs that corresponds to the identified model is updated to the usable state.

22 Claims, 10 Drawing Sheets

(56) References Cited

U.S. PATENT DOCUMENTS

| | | | | |
|---|---|---|---|---|
| 2005/0033699 | A1* | 2/2005 | Umeo | G06F 21/10 705/56 |
| 2005/0149448 | A1* | 7/2005 | Yanase | G10H 1/0058 705/56 |
| 2008/0027734 | A1* | 1/2008 | Zhao | H04N 5/76 704/502 |
| 2011/0174137 | A1 | 7/2011 | Okuyama et al. | |

FOREIGN PATENT DOCUMENTS

| | | | |
|---|---|---|---|
| GB | 2359657 | A | 8/2001 |
| JP | 2003271766 | A | 9/2003 |
| JP | 2003337585 | A | 11/2003 |
| JP | 2004213177 | A | 7/2004 |
| JP | 3614061 | B2 | 1/2005 |
| JP | 2005195901 | A | 7/2005 |
| JP | 4029735 | B2 | 1/2008 |
| JP | 2010034922 | A | 2/2010 |
| WO | 01/16931 | A1 | 3/2001 |

OTHER PUBLICATIONS

Extended European Search Report issued in European Application No. EP12185603.3 mailed Jun. 8, 2016.

* cited by examiner

FUNCTION-CONTENT CORRESPONDENCY TABLE

| MODEL ID | STATE | FUNCTION | MUSIC CONTENT (MUSICAL SCORE DISPLAY DATA) |
|---|---|---|---|
| — | 0 | "TABLE OF CONTENTS"<br>"HELP" | A-001～A-010 |
| XXX01 | 1 | "TABLE OF CONTENTS"<br>"HELP" "PRINT"<br>"LAYOUT : 1 PAGE & 2 PAGES" | A-011～A-100 |
| XXX02 | 2 | "TABLE OF CONTENTS"<br>"HELP" "PRINT"<br>"LAYOUT : 1 PAGE, 2 PAGES & 4 PAGES" | A'-011～A'-100 |

UPDATING MUSIC CONTENT OR PROGRAM TO USABLE STATE IN COOPERATION WITH EXTERNAL ELECTRONIC AUDIO APPARATUS

BACKGROUND

The present invention relates an auxiliary or dependent apparatus which processes (e.g., displays or prints) music content, such as musical score data, in cooperation with an external electronic audio apparatus (hereinafter, such an auxiliary or dependent apparatus will be referred to as "electronic-audio-apparatus cooperating apparatus"), and more particularly to a technique for automatically changing or updating, to a usable state, music content or program, stored in the auxiliary or dependent apparatus by downloading or otherwise, in cooperation with the external electronic audio apparatus.

Heretofore, there have been known apparatus using music content, such as musical score data. In Japanese Patent Application Laid-open Publication No. 2003-271766, for example, discloses that a user can download electronic music information (content) including electronic musical score data from a content selling site, and that, of such downloaded content, the user can use only content having embedded therein a same licensed equipment ID as an equipment ID of a music-content utilizing apparatus possessed by the user. Namely, according to the technique disclosed in the No. 2003-271766 publication, a list of the content downloaded into a storage medium of the music-content utilizing apparatus possessed by the user, and once the user selects, from among the displayed content, content which the user wants to use, a determination is made as to whether any one of the licensed equipment IDs embedded in the selected content matches the equipment ID of the music-content utilizing apparatus possessed by the user is displayed. If any one of the licensed equipment IDs embedded in the selected content matches the equipment ID of the music-content utilizing apparatus possessed by the user, then the selected content is read out from the storage medium so that it can be used. If, on the other hand, none of the licensed equipment IDs embedded in the selected content match the equipment ID of the music-content utilizing apparatus possessed by the user, a message to the effect that the selected content is not usable, without the selected content being read out from the storage medium.

With the technique disclosed in patent literature 1, even content that cannot be licensed to the user is displayed on the list at the time of content selection so that the user is allowed to select even content that is not usable, as a result of which the user would perform a wasteful selection operation. Further, a licensed equipment ID has to be embedded in advance in each content provided by the content selling site. Besides, when the equipment ID of the music-content utilizing apparatus possessed by the user has changed, for example, due to replacement of the music-content utilizing apparatus with a new one, content that was usable before the replacement cannot be used any longer, and thus, extra operations and costs would be required for downloading content again from the content selling site.

Further, it has also been known to use the music-content utilizing apparatus of the aforementioned type with functions extended by installing an additional function in the apparatus. Further, Japanese Patent No. 3,614,061, for example, discloses an automatic performance apparatus whose functions can be readily extended by various plug-in programs being installed from a storage medium through user's operations. Furthermore, in a music piece data reproduction apparatus disclosed in Japanese Patent No. 4,029,735, a music piece data set comprising reproducing performance data and purchase information and having reproduction limitation event data included in the performance data is acquirable from a server. When the music piece data set is reproduced on the reproduction apparatus, and if the purchase information is "test-listening version", the reproduction functions (such as a musical score display function) can be limited by the reproduction limitation event data being read out from the performance data.

Furthermore, in an information processing apparatus disclosed in Japanese Patent Application Laid-open Publication No. 2004-213177, execution of a plurality of partial programs (such as plug-in modules), providing different functions, is managed by a management program, each of a plurality of musical instruments, which become objects of selection in execution of the management program, and one or more partial programs of the plurality of partial programs are associated with each other by a configuration file, and one or more partial programs corresponding to a user-selected musical instrument can be identified and executed on the basis of the configuration file through execution of the management program.

However, in order to effect functional extension, the user has to perform some kinds of operation, such as a selection operation and setting operation. Further, in the case where content has limitation information, it is necessary to remove the limitation, for example, by performing a content purchase procedure.

SUMMARY OF THE INVENTION

In view of the foregoing prior art problems, it is an object of the present invention to provide a technique for reducing time and labor, such as a selection operation and setting operation, that has to be performed by a user for setting newly-acquired music content or function executing program in a usable state.

In order to accomplish the above-mentioned object, a first aspect of the present invention provides an improved apparatus operating in cooperation with an external electronic audio apparatus, which comprises: a storage section storing therein one or more sets of music content, at least a part of the one or more sets of music content being set in a non-usable state at least in an initial state; a reception section configured to receive a signal transmitted by the external electronic audio apparatus; a determination section configured to determine whether the signal received by the reception section satisfies a predetermined condition; and a state update section configured to, when the determination section has determined that the signal satisfies the predetermined condition, updates, to a usable state, at least a part of the sets of music content, stored in the storage section, that is currently set in the non-usable state.

The above-mentioned "initial state" is, for example, a state where the one or more sets of music content have just been downloaded into the storage section after purchase, and where use of the thus-downloaded music content has not yet been started. For example, all of the sets of music content having just been downloaded into the storage section may be initially set in the non-usable state, and then may be set in (updated to) the usable state only through a predetermined process performed according to the present invention. Note that the "music content" handled in the present invention may be any type of content as long as it relates to music reproducible by the external electronic audio apparatus which the apparatus of the present invention cooperates with; for convenience of description, the external electronic audio apparatus will hereinafter be referred to also as "cooperating-with electronic audio apparatus", "depending-on electronic audio apparatus", "cooperating-with object", "depending-on object" and the like, and the apparatus operating in cooperation with the external electronic audio apparatus will hereinafter be referred to also as "electronic-audio-apparatus cooperating apparatus". For example, each of the sets of music content may comprise any one of musical score display data, performance guiding illustration data, lyrics displaying data, chord name displaying data, chord progression instructing data (non-displaying data), accompaniment style data (non-displaying data), additional information, comment data, music-piece-associated data like corresponding MIDI data, and the like.

Further, the "predetermined condition" may be any condition as long as it allows the apparatus operating in cooperation with the external electronic audio apparatus (i.e., electronic-audio-apparatus cooperating apparatus) to confirm or presume that the signal received via the reception section has been duly generated by the external electronic audio apparatus the apparatus in question can cooperate with, namely, as long as the electronic-audio-apparatus cooperating apparatus can confirm or presume that it has received some type of signal transmitted from the cooperating-with or depending-on external electronic audio apparatus. For example, if the reception section has received a particular type of signal that is predetermined in advance as a signal generated from the external electronic audio apparatus, then it may be determined that the predetermined condition has been satisfied.

In a preferred embodiment, when the determination section has determined that the signal satisfies the predetermined condition, the state update section effects updating of the music content such that all of the sets of content stored in the storage section and associated with the electronic audio apparatus are placed in the usable state.

In an embodiment, the additional information includes at least model identification information capable of identifying a model of the electronic audio apparatus. When the determination section has determined that the signal satisfies the predetermined condition, the state update section effects updating of the music content such that any of the sets of content, stored in the storage section, that is associated with the electronic audio apparatus identified by the model identification information is placed in the usable state.

As an example, the cooperating-with (depending-on) electronic audio apparatus is an electronic music apparatus (such as an electronic musical instrument, sequencer or music piece reproduction apparatus), AV (Audio-Video) equipment that outputs an audio signal, PA equipment, a television receiver, or the like. On the other hand, the apparatus operating in cooperation with the external electronic audio apparatus (i.e., electronic-audio-apparatus cooperating apparatus) is a music content display apparatus (musical score display apparatus), a recording apparatus, a game apparatus, a training apparatus, a music piece data editing apparatus, an automatic accompaniment apparatus, or the like.

According to the present invention, when the electronic-audio-apparatus cooperating apparatus could recognize that it is communicable with the cooperating-with external electronic audio apparatus, the electronic-audio-apparatus cooperating apparatus regards a user possessing the electronic-audio-apparatus cooperating apparatus as an owner (purchaser) of the external electronic audio apparatus, and each set of music content already stored in the storage section but currently set in the non-usable state although it is associated with the electronic audio apparatus is automatically updated to the usable state through an update operation by the state update section. The update operation by the state update section need not necessarily be fully automatic and may be executed by the user depressing or operating an update executing button once when an "update" message has been displayed.

Thus, the present invention can significantly reduce time and labor, such as a selection operation and setting operation, that has to be performed by the user for setting newly-acquired music content in the usable state. Further, even when the user has re-installed an operating program of the electronic-audio-apparatus cooperating apparatus or replaced the electronic-audio-apparatus itself with a new one due to some inconvenience, version upgrade or the like, the same state as before the re-installation of the operating program or before the replacement can be promptly resumed (namely, the usable state of all of the stored sets of music content can be readily reproduced following the re-installation of the operating program or the replacement) once the electronic-audio-apparatus cooperating apparatus receives a predetermined signal after being placed in a state capable of communicating with the external electronic audio apparatus, which is very convenient. Further, according to the present invention, not only user's necessary operations can be reduced but also the user can be automatically presumed or regarded as an owner (purchaser) of the cooperating-with (depending-on) external electronic audio apparatus, so that security can be secured for additional sets of music content (such as musical score display data) associated with sets of music content (such as music piece data) preset or built-in in the electronic audio apparatus duly possessed by the user. Further, according to the present invention, each set of music content (such as musical score display data) automatically updated to the usable state necessarily becomes associated with the cooperating-with (depending-on) external electronic audio apparatus.

In an embodiment, the reception section receives, from the electronic audio apparatus, an audio signal carrying additional information, and the determination section extracts the additional information from the audio signal received by the reception section, and determines, on the basis of the extracted additional information, whether the received audio signal satisfies the predetermined condition. With such arrangements, any necessary additional information can be received from the external electronic audio apparatus with a simple wireless method using an audible audio signal. Thus, the present invention can perform a process for updating any necessary set of music content to the usable state by merely powering on the electronic-audio-apparatus cooperating apparatus and the external electronic audio apparatus and placing these two apparatus relatively close to each other, without directly interconnecting the two apparatus. In this case, if the additional information has been extracted from the received audio signal, the determination section may determine that the received audio signal satisfies the predetermined condition.

In an embodiment, the additional information includes at least content identification information capable of identifying music content, and the apparatus operating in cooperation with the external electronic audio apparatus further comprises a control section configured to read out, from the storage section, music content identified by the content identification information included in the additional information extracted from the received audio signal. Thus, the external electronic audio apparatus can instruct the control section to read out a particular set of music content from the storage section.

According to a second aspect of the present invention, there is provided an improved apparatus operating in cooperation with an external electronic audio apparatus, which comprises: a storage section storing therein one or more function executing programs, at least a part of the one or more function executing programs being set in a non-usable state at least in an initial state; a reception section configured to receive a signal transmitted by the external electronic audio apparatus; a determination section configured to determine whether the signal received by the reception section satisfies a predetermined condition; and a state update section configured to, when the determination section has determined that the signal satisfies the predetermined condition, updates, to a usable state, at least a part of the function executing programs, stored in the storage section, that is currently set in the non-usable state.

Each of the "function executing programs" comprises at least one of various programs for executing functions, such as a layout switching function, printing function, zoom switching function and the like. In addition, various desired programs may be stored in the storage section as the function executing programs, in accordance with functions that can be possessed by the electronic-audio-apparatus cooperating apparatus.

The invention according to the second aspect is different from the aforementioned invention according to the first aspect only in that an object of update is the function executing program rather than the music content, and the invention according to the second aspect and the invention according to the first aspect are generally identical to each other in terms of the other technical features. Therefore, the invention according to the second aspect has similar embodiments and modifications to the invention according to the first aspect and can achieve similar advantageous benefits to the invention according to the first aspect.

The present invention may be constructed and implemented not only as the apparatus invention discussed above but also as a method invention. Also, the present invention may be arranged and implemented as a software program for execution by a processor, such as a computer or DSP, as well as a non-transitory storage medium storing such a software program. In this case, the program may be provided to a user in the storage medium and then installed into a computer of the user, or delivered from a server apparatus to a computer of a client via a communication network and then installed into the client's computer. Further, the processor used in the present invention may comprise a dedicated processor with dedicated logic built in hardware, not to mention a computer or other general-purpose processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE INVENTION

An electronic-audio-apparatus cooperating system according to a preferred embodiment of the present invention comprises an electronic audio apparatus, and an electronic-audio-apparatus cooperating apparatus that collaborates or cooperates with the electronic audio apparatus. For example, an electronic music apparatus, such as an electronic musical instrument, is used as the electronic audio apparatus that outputs audio signals of tones and the like, while a music content display apparatus, such as a musical score display apparatus, is used as the electronic-audio-apparatus cooperating apparatus that operates in cooperation with the electronic audio apparatus. A description will hereinafter be given about the preferred embodiment of the present invention with reference to the accompanying drawings in relation to a case where a music content display system comprising the electronic audio apparatus and the electronic-audio-apparatus cooperating apparatus functions as the electronic-audio-apparatus cooperating system.

[Example System Construction and Hardware Construction]

Figure 1:
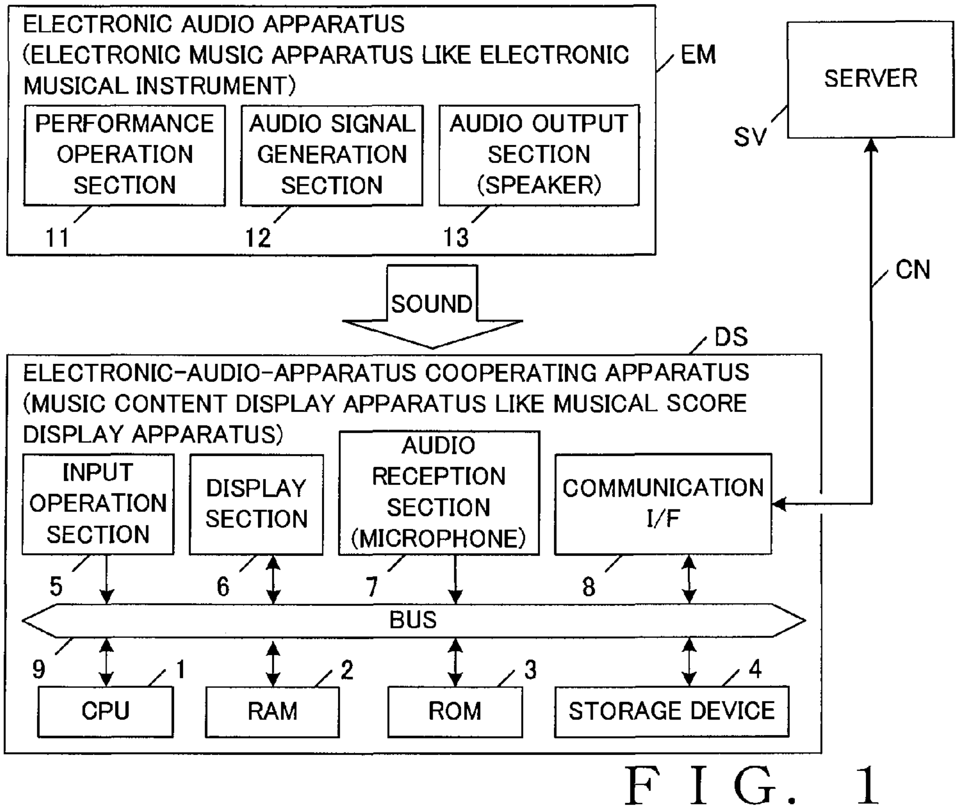
FIG. 1 is a block diagram showing an example construction of a music content display system according to a preferred embodiment of the present invention.

FIG. 1 is a block diagram showing an example construction of the electronic-audio-apparatus cooperating system (music content display system) according to the preferred embodiment of the present invention. The electronic-audio-apparatus cooperating system comprises the electronic-audio-apparatus cooperating apparatus (music content display apparatus, such as a musical score display apparatus) DS, and the electronic audio apparatus (electronic music apparatus, such as an electronic musical instrument) EM which is external to the electronic-audio-apparatus cooperating apparatus DS and with which the electronic-audio-apparatus cooperating apparatus DS cooperates. As an example, a tablet (touch panel) type mobile information processing apparatus is used as the electronic-audio-apparatus cooperating apparatus DS. The mobile information processing apparatus is, for example, a personal information processing apparatus, such as a portable information terminal (mobile PDA) or a smart phone.

The electronic-audio-apparatus cooperating apparatus (hereinafter referred to also as "music content display apparatus") DS includes, as its hardware components, a central processing unit (CPU) 1, a random access memory (RAM) 2, a read-only memory (ROM) 3, a storage device 4, an input operation section 5, a display section 6, an audio reception section (audio input section) 7, a communication interface (I/F) 8, etc. and these components are interconnected via a bus 9.

The CPU 1, which controls the entire music content display apparatus DS, constitutes a data processing section for performing various processing in accordance with various control programs including an electronic-audio-apparatus cooperating processing program (e.g., music content display processing program). The RAM 2 is used for temporarily storing various data necessary for these processing. For example, at the time of electronic-audio-apparatus cooperating processing (music content display processing) based on the electronic-audio-apparatus cooperating processing program (music content display processing program), there are provided, in the RAM 2, a reception counter for counting the number of times of reception of control information (Cs) (hereinafter referred to as "reception count"), and a function flag that is set when a predetermined reception condition has been satisfied. Further, predetermined control programs and controlling data are stored in the ROM 3.

The storage device 4, which includes a storage medium, such as a flash memory, and a drive therefor, can store control programs and various data into the storage medium. The storage medium may be of a removable type or may be built in the music content display apparatus DS. Further, applications, such as the music content display processing program, can be stored in the storage device 4 together with music content, such as musical score data (more specifically, one or more sets of musical score data, or one or more musical score data sets). Particularly, a storage section (STd) is provided in the storage device 4 for storing music content, such as musical score data, and the electronic-audio-apparatus cooperating processing program, such as music content display program (musical score display program). A variable (STATE) indicative of a model rank of the electronic audio apparatus EM with which the music content display apparatus DS can currently cooperate. Note that the electronic-audio-apparatus cooperating processing program includes additional programs for executing various functions, and such additional programs will hereinafter be referred to as "function executing programs".

The input operation section (setting operation section) 5 detects a setting operation performed via a setting operator, such as a switch, and introduces various setting information, corresponding to the detected setting operation, to the data processing section. The display section 6 is constructed to control displayed content on a display device, such as an LCD, in accordance with an instruction given from the CPU 1. The display section 6 is also constructed to provide displays for assisting in various user's setting operations and graphically display desired displaying content, such as a musical score. In the following description, let it be assumed that the display section 6 is constructed as a touch-panel type display having functions of setting operators and display device integrated therein. The audio reception section (audio input section) 7 includes a microphone and an audio signal input section, and it can introduce an audio signal, input from the electronic music apparatus EM via the microphone into the data processing section via an audio signal input section.

The communication I/F 8 includes a wired IF for music, such as a MIDI I/F, a general-purpose network I/F such as a USB I/F and a general-purpose near field wireless I/F, such as a wireless LAN, so that it can communicate with a server SV via a network CN. For example, the communication I/F 8 can acquire music content for performance and/or display, such as music piece data and music-piece guiding illustration data, the function executing programs for executing predetermined functions related to a music content display, and the like, and it can store the thus-acquired music content and programs into the storage section (STd) of the storage device 4. Further, a printer (not shown) is communicatably connectable to a print output section (not shown) in a wired or wireless fashion.

The electronic audio apparatus (hereinafter referred to also as "electronic music apparatus") EM generates an audio signal to the music content display apparatus DS. The electronic music apparatus EM may comprise generally the same hardware components as the music content display apparatus DS. In addition to such hardware components, the electronic music apparatus EM further includes, among other things: a performance operation section 11 for detecting a performance operation performed via a performance operator, such as a keyboard; an audio signal generation section 12 for generating an audio signal including a control signal and a tone signal; and an audio output section 13 for outputting a generated audio signal as sound waves through a speaker. Note, however, the electronic music apparatus EM need not necessarily include the audio input section, and the display section of the electronic music apparatus EM may be of a lower grade. Namely, although the electronic music apparatus EM too includes a display device, the display device of the electronic music apparatus EM is of a simpler construction than the display section 6 of the music content display apparatus (information processing apparatus) DS and of a type incapable of graphically displaying desired displaying content (such as a musical score). Note that the performance operation section 11 may be any desired type of musical instrument other than a keyboard instrument, such as a string instrument, wind instrument or percussion instrument. Further, the electronic music apparatus EM is not necessarily limited to the type where the performance operation section 11, the audio signal generation section 12 etc. are provided within a single apparatus body, and may be of a type where the performance operation section 11, the music piece data reproduction and audio signal generation section 12 etc. are constructed as separate modules that are interconnected via a MIDI interface and a network communication interface, such as a LAN.

[Electronic Music Apparatus (Electronic Audio Apparatus) EM]

Figure 2:
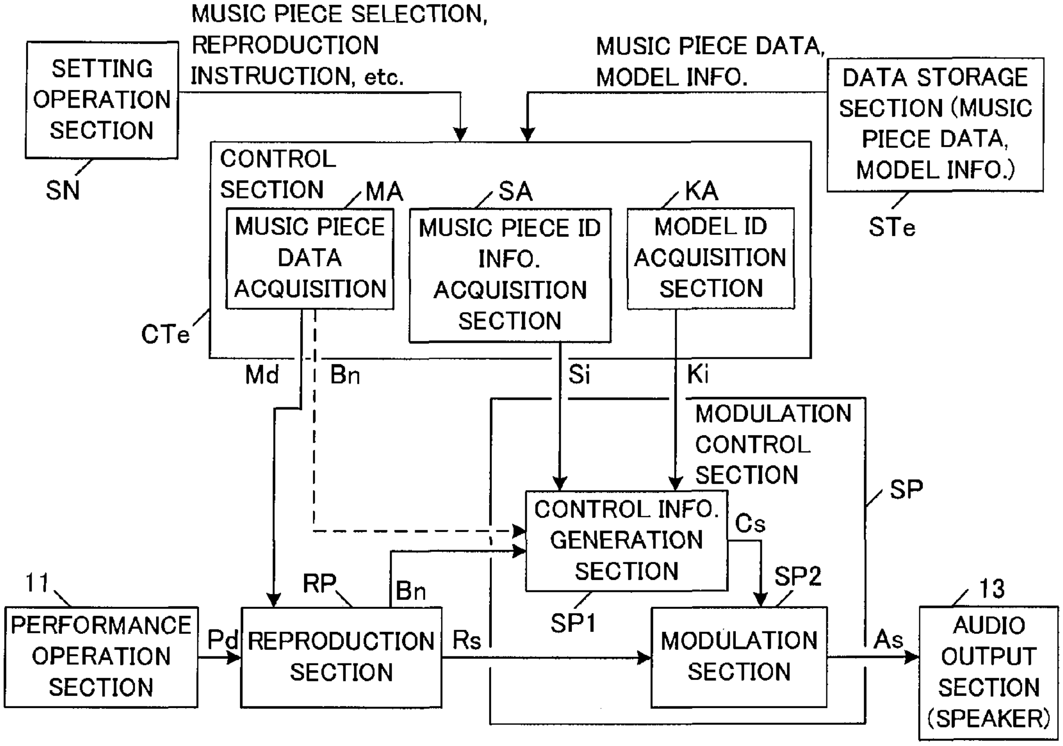
FIG. 2 is a functional block diagram of an electronic music apparatus in the embodiment of the present invention.

In the instant embodiment of the electronic-audio-apparatus cooperating system (music content display system), the electronic music apparatus EM has not only the function of the electronic musical instrument but also the function of the music reproduction apparatus for reproducing desired reproducing music data (music piece data), such as MIDI data and audio data, as noted above. The electronic music apparatus EM as the music reproduction apparatus has not only a music piece reproduction function for time-serially reproducing desired reproducing music data (music piece data), such as MIDI data and audio data, but also a function for generating and outputting displaying control information (i.e., control information intended for displaying), associated with a currently reproduced music piece, as an audio signal (e.g., spatially sounding the audio signal as sound waves). Such an audio signal is received by the music content display apparatus (i.e., electronic-audio-apparatus cooperating apparatus) DS, where the displaying control information is extracted from the audio signal. Then, the music content display apparatus (information processing apparatus) DS prepares and displays given music content (i.e., displaying music-piece-associated data, such as musical score data and music-piece guiding illustration data, namely, displaying content) in accordance with the extracted displaying control information. FIG. 2 is a functional block diagram of the electronic music apparatus (electronic audio apparatus) EM in the instant embodiment of the present invention. A data storage section STe is built in the storage device of the electronic music apparatus EM, and one or more sets of reproducing music data (music piece data), such as MIDI data and audio data, and model information related to the model of the electronic music apparatus EM are prestored in the data storage section STe as sets of usable music content. Each of such music content contains, in addition to music piece data Md as substantive data, music piece information identifying the music piece corresponding to the music piece data Md. The music piece information includes reference information, such as a music piece name and performer's name, and music piece ID information Si. The music piece ID information Si is unique information identifying the music content in question, which is also called music piece ID, ID information or music piece number and which functions also as "music content identification information" identifying music content to be used for displaying (i.e., displaying music-piece-associated data, namely, displaying content).

Note that the music content (i.e., displaying music-piece-associated data or displaying content) may include music piece ID information Si as additional information, and/or a table or program defining correspondency between various sets of music content (i.e., displaying music-piece-associated data or displaying content) and music piece ID information Si may be prestored in the music content display apparatus DS. Further, music piece ID information Si may be converted in advance, by means of a table or the like, in the electronic music apparatus EM into content identification information for use in the music content display apparatus DS, so that a particular item or set of music content (i.e., displaying music-piece-associated data or displaying content) can be identified directly from the converted content identification information.

The electronic music apparatus EM includes, as functional blocks additional to the aforementioned data storage section STe, a setting operation section SN, a control section CTe, a reproduction section RP and a modulation control section SP. The setting operation section SN has various switches and operators, such as music piece selection switches, a music piece reproduction switch and a control button for switching between ON and OFF states of control signal output, and it detects user's music piece selection and reproduction instructions given by such switch operations and setting operations, such as a control signal output ON/OFF setting operation, and then supplies the detected results to the control section CTe. The control button may be dispensed with, in which case, for example, the control signal output may be turned on or off in response to ON/OFF states of the music piece selection and reproduction switches.

The control section CTe, which is a functional block implemented mainly by a CPU, includes a music piece data acquisition section MA, a music piece ID acquisition section SA and a model ID acquisition section KA. The music piece data acquisition section MA reads out, from the data storage section STe, music content corresponding to a music piece designated through a user's music piece selection operation detected by the setting operation section SN and outputs the music piece data (MIDI data, audio data, etc.) Md, contained in the read-out music content, to the reproduction section RP. Further, the music piece ID acquisition section SA acquires the music piece ID information Si from the read-out music content and outputs the acquired music piece ID information Si to the modulation control section SP. Further, the model ID acquisition section KA acquires model ID information, indicative of the model of the electronic music apparatus EM, from the model information of the data storage section STe and then outputs the acquired model ID information to a modulation control section SP.

The reproduction section RP and the modulation control section SP are functional blocks implemented mainly by the audio signal generation section 12. The reproduction section RP has a function for automatically reproducing music piece data Md (automatic reproduction or performance function) and a tone generation function. Namely, once music piece reproduction is instructed by turning-on of the music piece reproduction switch of the setting operation section SN, the reproduction section RP automatically reproduces time-serially the music piece data Md from the music piece data acquisition section MA within the control section CTe and generates tone signals corresponding to the read-out music piece data. Such a music piece data reproduction process may be performed by use of a construction conventionally known in the field of MIDI sequencers or the like. Note that the music piece data Md may comprise wave data compressed by the MP3 compression technique or the like rather than being limited to event information like MIDI data, in which case the music piece data reproduction process may comprise decoding the compressed wave data into PCM-modified tone signals and reproducing the PCM-modified tone signals. Also, in response to a performance operation being performed by the user on the performance operation section 11, the reproduction section RP generates tone signals corresponding to performance data Pd based on the performance operation. The thus-generated tone signals Rs are each supplied to the modulation control section SP. If the user executes a perform operation on the performance operation section 11 in response to reproduction of the music piece data Md, both tone signals based on the reproduction of the music piece data Md and tone signals based on the performance data Pd are generated. If only the music piece data Md are reproduced, only tone signals based on the reproduction of the music piece data Md are generated. Further, if, on the other hand, the user executes a performance operation on the performance operation section 11 without the music piece data Md being reproduced, then only tone signals based on the performance data Pd are generated. Further, when the music piece data Md are being reproduced, the reproduction section RP generates reproduced position information Bn each indicative of a current reproduced position in accordance with a progression of the reproduction of the music piece and outputs the thus-generated reproduced position information Bn to the modulation control section SP. The reproduced position information Bn may be indicative of any desired range on the musical score, such as a measure number (also referred to as a measure position) indicative of a measure number of a measure where a currently reproduced tone (note) is located or a page number of a page where a currently reproduced tone (note) is located. In the following example, the measure number is used, or indicated, as the reproduced position information Bn.

As depicted by broken line in FIG. 2, the reproduced position information Bn may be generated directly by the control section CTe or acquired from the music piece data Md so that it is output to the modulation control section SP, as the music piece data Md are read out by the reproduction section RP. For example, where the music piece data Md include timing data like master track information, the timing data may be read out directly as the reproduced position information Bn in synchronism with the readout of the music piece data Md.

The modulation control section SP includes a control information generation section SP1 for generating control information Cs, and a modulation section SP2 for generating an audio signal carrying additional information. The additional information carried by the audio signal is the above-mentioned control information Cs. The modulation section SP2 further superimposes (mixes) a tone signal Rs, supplied from the reproduction section RP, and the audio signal, carrying the additional information (control information Cs) on (with) each other. The control information Cs includes at least one of first control information Cs1 having at least music piece ID information and called "score page turning signal" and second control information Cs2 including at least model ID information for identifying the model of the electronic music apparatus EM The control information generation section SP1 is activated once a "score page turning" function is turned on in response to the user turning on a score page turning control button (score page turning function selector) in the setting operation section SN, so that it generates the first control information Cs1 called "score page turning signal" at predetermined time intervals (e.g., every 0.5 seconds). Also, the control information generation section SP1 is activated once a model ID transmission button is turned on in the setting operation section SN, so that it generates the second control information (model ID signal) Cs2 on the basis of model ID information Ki, given from the control section CTe, at predetermined time intervals (e.g., every 0.5 seconds). Further, once the "score page turning" function is turned off in response to the user turning off the score page turning control button, the control information generation section SP1 terminates the score page turning function so that the first control information (score page turning signal) Cs1 is no longer generated. Similarly, once a "model ID transmission function" is turned off, the control information generation section SP1 terminates the model ID transmission function so that the second control information (model ID signal) Cs2 is no longer generated. However, the control information generation section SP1 may generate other types of control signals, such as tempo information.

Figure 3:
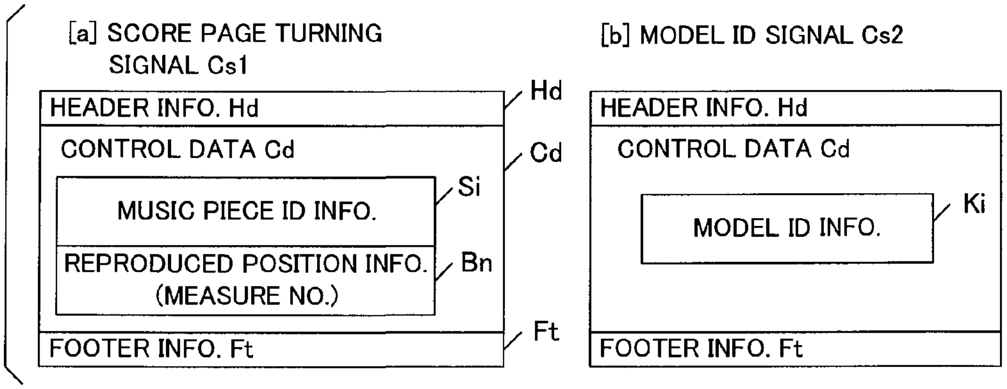
FIG. 3 is a diagram showing an example format of control information in the embodiment of the present invention.

FIG. 3 is a diagram showing an example format of the control information Cs in the embodiment of the present invention. As shown in (a) of FIG. 3, the score page turning signal (first control information) Cs1 includes control data (called "score page turning signal information") Cd including, as substantive data, music piece ID information Si and reproduced position information (measure position) Bn, and the music content display on the music content display apparatus DS can be controlled with the control data Cd. The model ID signal (second control information) Cs2, as shown in (b) of FIG. 3, includes control data Cd including, as substantive data, model ID information Ki, and the functions of the function executing programs in the music content display apparatus DS (or type of music content to be displayed) can be controlled with the control data Cd. According to the example format of FIG. 3, these control information Cs1 and Cs2 includes header information Hd of about one byte, control data Cd of about two bytes and footer information Ft of about one byte. The header information Hd includes information indicating that the signal in question is control information ("score page turning signal" or "model ID signal") Cs, information capable of identifying a length of the control data Cd, etc. The control data Cd includes music piece ID information Si of about eight bits and reproduced position information Bn of about eight bits, and the footer information Ft includes information indicative of the end of the control data Cd and the like.

In such a manner that the audio signal of a predetermined frequency band carries the control information (additional information) Cs that is digital data output from the control information generation section SP1, the modulation section SP2 modulates the audio signal with the control information Cs and superimposes (mixes) the modulated audio signal on (with) a tone signal supplied from the reproduction section RP, and then, the modulation section SP2 outputs, to the audio output section 13, a sound signal As having the tone signal and the audio signal, modulated with the control information Cs, superimposed thereon (or mixed therewith). Using, for example, the direct sequence spread spectrum technique, the modulation section SP2, the modulation section SP2 performs a modulation process for including the control information Cs (which is a digital signal) in the audio signal functioning as a carrier signal. The audio output section 13 spatially sounds the sound signal As as sound waves through a speaker. The audio signal that functions as a carrier signal for transmitting the control information Cs is a signal of a high frequency band of, for example, about 18 kHz, so that data can be transmitted using a high frequency band of about 18 kHz that is within an audio frequency range reproducible via an ordinary speaker but hardly audible to the human ear (particularly, to the ear of adults). In this case, although the data transmission speed is not so high with a maximum of about 80 bps, there are achievable advantageous benefits that data of displaying control information can be transmitted to a location more than ten meters away and can be simultaneously distributed to a plurality of recipients (i.e., in a "one-to-many distribution" fashion), existing speaker equipment can be used and a transmission range can be controlled through sound volume adjustment of the speaker. Note that the audio signal functioning as a carrier signal for transmitting the control information Cs is not necessarily limited to the frequency band of about 18 kHz and may be of another frequency band normally hardly audible to the human ear or another frequency band audible to the human ear.

Note that a sound signal As that does not contain an audio signal for carrying control information Cs (such as a signal of an ordinary performance sound) may sometimes be output. For example, when the score page turning control button provided in the setting operation section SN is OFF or the "model ID transmission function" is OFF, no control information Cs is generated from the control information generation section SP1, no audio signal is generated either, and hence, no modulation is performed. In this case, the sound signal As comprises only a tone signal generated from the reproduction section RP.

When the score page turning control button provided in the setting operation section SN is ON or the "model ID transmission function" is ON, on the other hand, control information Cs is generated from the control information generation section SP1 at predetermined time intervals (e.g., every 0.5 seconds), so that an audio signal is constantly generated and modulated and the thus-modulated audio signal is constantly output. In this case, even when the current reproduced position has not changed, control information Cs including reproduced position information Bn indicative of the same reproduced position is repetitively generated at the predetermined time intervals, in response to which modulation of the audio signal is updated at the predetermined time intervals.

The first reason why selection/setting as to whether or not the audio signal for transmitting the control information Cs should be generated, although such an audio signal is of a high frequency band, normally not audible to the human ear, within the audio frequency range, is that high-band signals in the frequency band of about 18 kHz may be heard depending on a user's age (particularly, child of low age). If such an audio signal is generated even where the user does not require automatic score page turning control, the audio signal mixed in a tone signal would be undesirably heard and become extremely disagreeable to the user's ear. Therefore, the instant embodiment is constructed such that, in the case where the automatic score page turning control is not required, it does not generate the audio signal for transmitting the control information. The second reason is that, in a case where a plurality of the electronic music apparatus (music reproduction apparatus) EM are provided in the music content display system, the automatic score page turning control cannot be performed appropriately due to signal interference if audio signals are output from two or more of the electronic music apparatus (music reproduction apparatus) EM; in such a case, it is appropriate to turn on the displaying audio signal generation function of only one of the electronic music apparatus EM with the displaying audio signal generation function of the other electronic music apparatus EM kept turned off. The third reason is that the user would face an inconvenience if the automatic score page turning control is performed although the user does not want the automatic score page turning control to be performed for some reason (e.g., because the user wants to perform with only a particular page of the musical score kept opened).

It should be appreciated that the electronic audio apparatus in the instant embodiment of the present invention may be any other type of equipment or apparatus than an electronic musical instrument, such as a karaoke apparatus, a personal computer, a portable communication terminal like a portable phone or a game apparatus, as long as it is constructed to be capable of audibly generating a tone through a speaker or the like.

[Display Function of the Music Content Display Apparatus (Electronic-Audio-Apparatus Cooperating Apparatus) DS]

Figure 4:
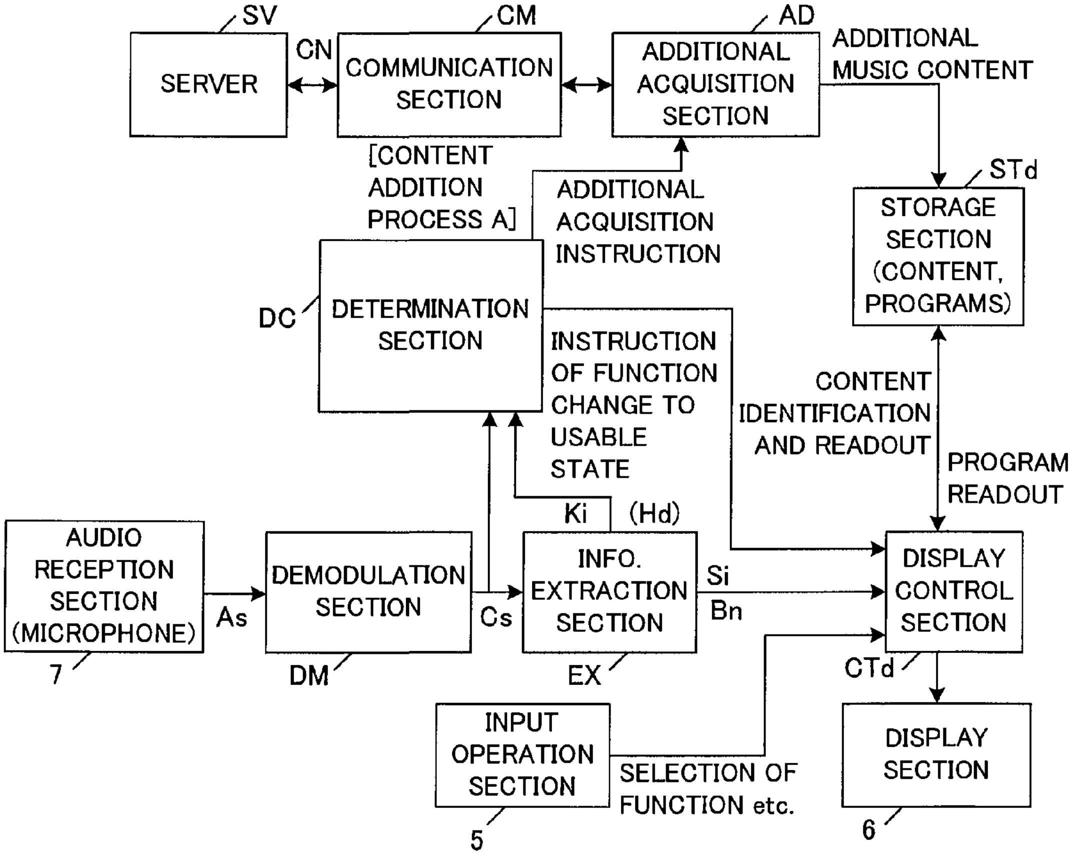
FIG. 4 is a block diagram showing a first function of a music content display apparatus in the embodiment of the present invention.
Figure 5:
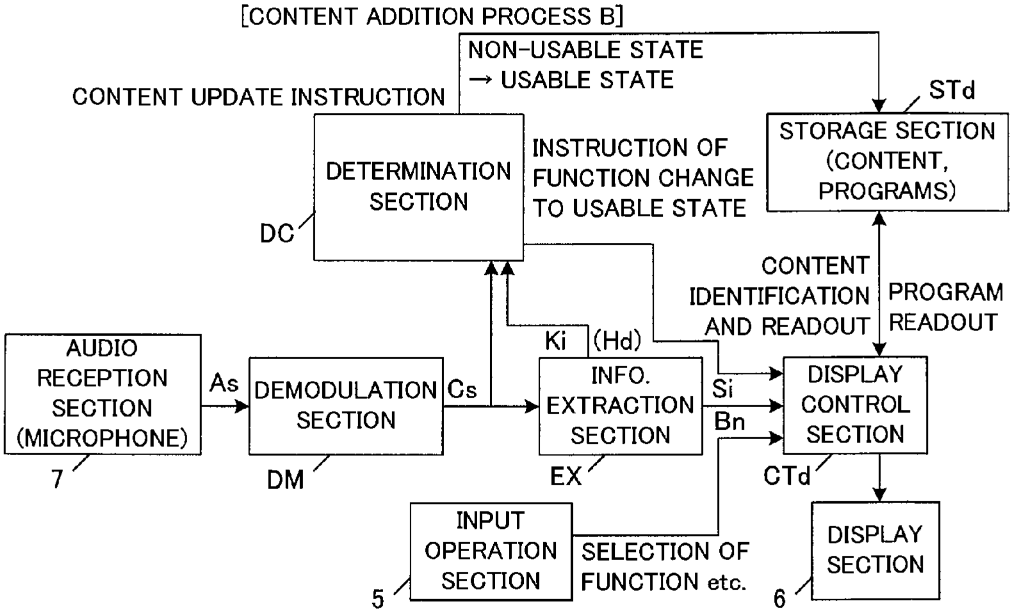
FIG. 5 is a block diagram showing a second function of the music content display apparatus in the embodiment of the present invention.

In the embodiment of the music content display system of the present invention, the music content display apparatus (electronic-audio-apparatus cooperating apparatus) DS has a function for receiving control information from the electronic music apparatus (electronic audio apparatus) and preparing and displaying given music content (displaying music-piece-associated data). FIGS. 4 and 5 are block diagrams showing first and second functions of the music content display apparatus in the embodiment of the present invention.

One or more sets of displaying content associated with individual music pieces (i.e., music-piece-associated data to be displayed as music content) are stored in a music content storage section within the storage section STd built or provided in the storage device 4 of the music content display apparatus (electronic-audio-apparatus cooperating apparatus cooperating apparatus) DS. Further, one or more function executing programs for executing predetermined functions, such as a layout switching function, printing function, zoom switching function and the like, are stored in a program storage section within the storage section STd. As such displaying content may be used any desired displaying content created such that switching is made between images in correspondence with a progression of a music piece; examples of the displaying content include musical score data, and music piece guiding illustration data created such that switching is made between guiding illustrations generally in a "picture-card" fashion in correspondence with a progression of a music piece). The following describe a case where an item or set of displaying content is a set of musical score data or a musical score data set. In the illustrated example, any desired portion (such as a page or display block) within a set of displaying content (musical score data) can be read out and displayed on a display screen in response to reproduced position information Bn and the like.

Each of the music content (musical score data set) contains, in addition to musical score data that are substantive data, music piece information identifying the music piece in question, such as reference information like the name (title) of the music piece, the name of a composer and the like, and content (musical score) identification information unique to the music content. The content identification information is associated with music piece ID information (music content identification information) Si included in control information Cs given from the electronic music apparatus EM. Further, each usable music content (music score data set) prestored in the storage section STd corresponds to at least a part of items or sets of usable music content (music piece data) preset (prepared in advance) or built-in in the electronic music apparatus EM. For each of the sets of music content (music piece data set) stored in the storage section STd, the storage section STd has stored therein, as stored information, records of the music piece name (title), content identification information, corresponding music piece ID (Si) (that is unnecessary in a case where a correspondency table or program is prepared in advance) and records of usability/non-usability. A list of music piece names (titles) (with which respective music piece IDs may be associated) of sets of currently stored usable music content (musical score data) can be displayed in response to user's operation of a table-of-contents button.

In a case where the music content display apparatus (electronic-audio-apparatus cooperating apparatus) DS is constructed in accordance with a later-described second function, at least a part (i.e., one or some) of the plurality of sets of music content (e.g., musical score data) stored in the storage section STd are set in a non-usable state at least in an initial state. In this case, the "initial state" is, for example, a state where the plurality of sets of music content have just been downloaded into the storage section STd after purchase, and where use of the music content thus stored in the storage section STd has not yet been started. For example, all of the sets of music content having just been downloaded into the storage section STd may be set in the non-usable state.

Similarly, in an embodiment according to the later-described second function, at least a part (i.e., one or some) of the function executing programs stored in the storage section STd are set in a non-usable state at least in an initial state. In this case, the "initial state" is, for example, a state where the function executing programs have just been downloaded into the storage section STd after purchase, and where use of the function executing programs thus stored in the storage section STd has not yet been started. For example, all of the function executing programs having just been downloaded into the storage section STd may be set in the non-usable state.

Further, the music content display apparatus DS includes a demodulation section DM, a determination section DC, an information extraction section EX and a display control section CTd, and these functional blocks are implemented mainly by the CPU 1. The audio reception section (audio input section) 7 receives a sound signal As in the form of sound waves transmitted from a speaker of the electronic music apparatus EM and inputs the received sound signal As to the demodulation section DM. Then, the demodulation section DM extracts a modulating component from the input sound signal As to thereby demodulate the extracted modulating component into control information Cs and outputs the demodulated control information Cs to the information extraction section EX and determination section DC. Note, however, that control information Cs is sometimes not contained, in which case no output is generated from the demodulation section DM. As noted previously, the control information Cs (Cs1, Cs2) is a digital signal included in an audio signal transmitted in a high frequency band of about 18 kHz constantly (once every 0.5 seconds) in response to turning-on of the score page turning control button or model ID transmission button (or alternatively during reproduction of a music piece after turning-on of a music piece selection/reproduction switch), and, particularly, the score page turning signal Cs1 is used to automatically switch a musical score display in a similar manner to actual manual page turning of the musical score. Note that the model ID signal Cs2 need not necessarily be transmitted constantly.

In a case where the control information Cs demodulated by the demodulation section DM is the score page turning signal Cs1, the information extraction section EX extracts control data Cd, i.e. music piece ID information Si and reproduced position information (measure number) Bn, from the score page turning signal Cs1, and then the information extraction section EX outputs the extracted control data Cd to the display control section CTd. Further, in a case where the control information Cs demodulated by the demodulation section DM is the model ID signal Cs2, the information extraction section EX can extract the control data Cd, i.e. model ID information Ki, from the model ID signal Cs2 and outputs the extracted control data Cd to the determination section DC. Once informed by the determination section DC that "function change to the usable state" has been completed, the display control section CTd reads out, from the storage section STd, a list of various function executing programs including the functions having been changed to the usable state and displays the read-out list on the display section 6. With reference the displayed list, the user can select a desired function executing program by operating the input operation section 5 and activate the selected function executing program to perform that function. Further, the display control section CTd identifies an item or set of music content (musical score data) corresponding to the music piece ID information Si by referencing the musical score identification information associated with the music piece ID information Si, reads out the identified set of music content (musical score data) from the storage section STd, determines a musical score page of the music content (musical score data) to be displayed in correspondence with the reproduced position information (measure number) Bn, and then sends data of the determined musical score page to the display section 6. Then, the display section 6 displays, on the screen, the musical score page indicated by the data sent from the display control section CTd.

The function of the information extraction section EX may be included in the function of the demodulation section DM so that the music piece ID information Si and reproduced position information Bn can be extracted from the first control information (score page turning signal) Cs1 and the model ID information Ki can be extracted from the second control information (model ID signal) Cs2 within the demodulation section DM. Alternatively, the function of the information extraction section EX may be included in the function of the display control section CTd so that the music piece ID information Si and reproduced position information Bn can be extracted from the first control information (score page turning signal) Cs1 and the model ID information Ki can be extracted from the second control information (model ID signal) Cs2 within the display control section CTd.

Figure 6:
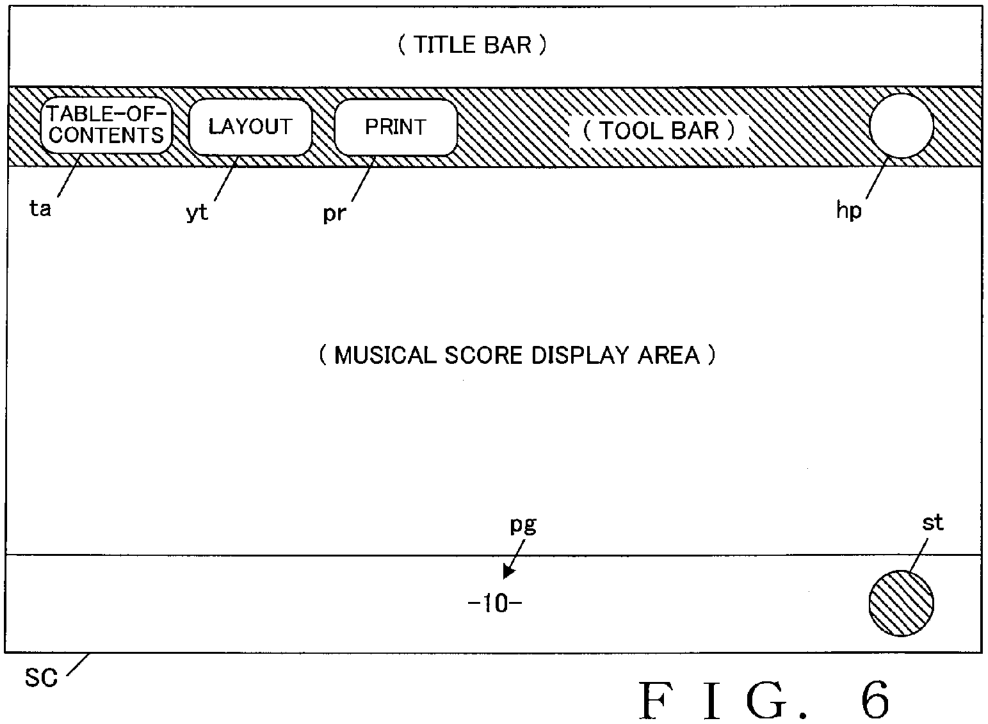
FIG. 6 is a diagram showing an example of a display screen in the embodiment of the present invention.

FIG. 6 shows an example of a display screen SC of the display section 6 in the embodiment of the present invention, and this display screen SC is in the form of a touch panel. The display screen SC has the following display function. On the display screen SC, a music piece name (title) etc. are displayed in a belt-shaped title bar display area located in an upper portion of the screen, and function buttons are provided in a belt-shaped toolbar display area located underneath the title bar display area. For example, a table-of-contents button ta is displayed in the toolbar display area near the left end thereof, a layout button yt and a print button pr are displayed to the right of the table-of-contents button ta, and a help button hp is displayed near the right end of the toolbar display area. In the illustrated example, the functions of the layout button yt and print button pr are in the non-usable state, and these buttons yt and pr displayed in a dark color indicating to the user that these buttons yt and pr are in an inoperable state. However, once changed (updated) to the usable state in response to receipt of the model ID signal Cs2, the layout button yt and print button pr are switched to a highlighted display and to an operable state. Note that the table-of-contents button ta and the help button hp are usable irrespective of receipt/non-receipt of a signal from the electronic music apparatus EM. Further, a main display area located centrally on the screen is allocated as a musical score display area where a given musical score is displayed based on musical score data. Furthermore, a page number pg ("10" in the illustrated example of FIG. 6) of a musical score being currently displayed in the musical score display area is displayed centrally in a lower portion of the screen, and a control signal lamp st is displayed in the lower portion of the screen near the right end thereof. Each time the control information Cs (score page turning signal Cs1 or model ID signal Cs2) is received, the control signal lamp st is illuminated to indicate a reception state of the control information Cs. In response to a user's touching operation on the help button hp, help information, version information, etc. are displayed in a part or whole of the main display area. In response to a user's touching operation on the table-of-contents button ta, a list of usable music content (i.e., music piece names or titles) stored in the storage section STd is displayed in the main display area.

Further, in response to a user's touching operation for selectively designating a desired music piece from the list of usable music content, a shift is made to a table-of-contents mode, so that a musical score corresponding to the designated music piece is displayed. In the table-of-contents mode, although not particularly shown, score page turning can be performed in response to a predetermined touching operation on the display screen; for example, a next page of the musical score (i.e., musical score portion of the next page) is displayed in response to a user's touching operation on a portion located to the right of the page number pg, or a preceding page of the musical score (i.e., musical score portion of the preceding page) is displayed in response to a user's touching operation on a portion located to the left of the page number pg. Thus, in the table-of-contents mode, the user can cause the musical score to be displayed on the display screen SC of the music content display apparatus DS and can perform the music piece through a performance operation via the performance operation section 11 of the predetermined electronic music apparatus EM while viewing the displayed musical score, irrespective of a reproduced state of the music content (reproducing music piece data) in the electronic music apparatus EM.

Whereas, in the illustrated example of the display screen, the buttons of various functions are displayed or provided in the toolbar display area, such buttons of various functions may be implemented by a menu bar. In the case where the buttons of various functions are implemented by a menu bar, an arrangement may be made such that, once any one of function groups is selected, a pulldown menu for selecting a function is displayed; thus, in response to user's operations on the menu bar, any desired one of usable functions can be selected and executed.

[Making Usable Music Content (or Function Executing Program) in the Music Content Display Apparatus (Electronic-Audio-Apparatus Cooperating Apparatus) DS]

Referring back to FIGS. 4 and 5, the determination section DC determines, on the basis control information Cs demodulated by the demodulation section DM, whether a sound signal (audio signal) received by the audio reception section 7 satisfies a predetermined reception condition. If it has been determined that the received sound signal satisfies the predetermined reception condition, a process is performed for allowing music content to be additionally stored or made additionally usable. The predetermined reception condition may be a condition capable of ascertaining that the information processing apparatus DS is in a state capable of communicating with (i.e., in a state capable of receiving control information Cs from) the music reproduction apparatus EM which the music content display apparatus is dependent on. For example, the predetermined reception condition may include at least a condition that it should be ascertained that control information Cs is included in the sound signal (audio signal) received by the audio reception section 7, i.e. that it should be ascertained that control information Cs has been extracted (demodulated) by the demodulation section DM. More specifically, the predetermined reception condition may be that (1) control information Cs has been received a predetermined number of times N, (2) a time interval at which a plurality of receptions of control information Cs have taken place is one second or less, and/or the like. In an example to be described below, it is assumed that condition (1) above is employed as the predetermined reception condition. In this case, if the predetermined number of times N is set at 1, the predetermined reception condition is satisfied when control information Cs has been received for the first time. If the predetermined number of times N is set at 10, the predetermined reception condition is satisfied when control information Cs has been received a total of ten times successively or unsuccessively. Note that reception of the control information Cs may be checked by monitoring an output state, in the demodulation section DM, of the control information Cs or by monitoring an extracted state, in the information extraction section EX, the header information Hd as depicted by parentheses.

Once the above-mentioned reception condition is satisfied, the music content display apparatus DS performs a content addition process, but also updates, via the determination section DC and the display control section CTd, function executing programs, stored in the storage section STd and set in the non-usable state, to the usable state. The music content display apparatus DS implements the function as the music content display apparatus by installing a music content display program, designed for implementing the instant embodiment, in a PDS (information processing apparatus) together with music content (musical score data). However, in order for the music content display apparatus DS to appropriately display music content in accordance with an instruction given from the electronic music apparatus EM, the music content display apparatus DS has to appropriately perform the music content addition process. The music content addition process is constructed to perform any one of the following first and second functions depending on an initial stored state, in the storage section STd, of music content (musical score data, i.e. displaying content). Namely, in the illustrated example, there are two types, i.e. first and second types, of the initial stored state, in the storage section STd, of music content (musical score data, i.e. displaying content). The first function is performed if the music content is initially stored in the storage section STd in the first type (first-type initial stored state), while the second function is performed if the music content is initially stored in the storage section STd in the second type (second-type initial stored state).

(1) First Function; For each music content (musical score data or displaying content) that is not prestored in the storage section STd of the music content display apparatus DS although it is "displaying music content" (musical score data or displaying content) corresponding to music content (reproducing music piece data) preset or prepared in advance (or built-in) in the electronic music apparatus EM, the first function automatically acquires the lacking displaying content from the server SV as "additional music content (additional displaying content)" and additionally stored into the storage section STd.

(2) Second Function: For each music content (musical score data or displaying content) currently set in an "non-usable state" although it is music content (musical score data or displaying content) corresponding to music content (reproducing music piece data) preset in the electronic music apparatus EM and prestored in the storage section STd of the music content display apparatus DS, the second function updates the music content in question to a "usable state" (i.e., changes the usability state setting to the "usable state") to thereby increase the number of usable music content (musical score data sets). Note that the present invention concerns this second function.

[The First Function of the Music Content Display Apparatus]

In order to perform the aforementioned first function, the music content display apparatus DS includes an additional acquisition section AD and a communication section CM. The additional acquisition section AD is implemented mainly by the CPU 1 of the music content display apparatus DS, and the communication section CM is implemented mainly by the communication I/F 8 of the music content display apparatus DS.

More specifically, the aforementioned first-type initial storage state where the first function is performed is a state in which, whereas p items or sets of usable (reproducible)

music content (i.e., p sets of reproducing music piece data sets) are preset in the data storage section STe of the electronic music apparatus EM, only r (p>r≥0) sets of music content (music piece data sets) are prestored in the storage section STd of the music content display apparatus DS. In order to perform the first function, for example, on a newly-purchased music content display apparatus DS, the user activates both the newly-purchased music content display apparatus DS and the electronic music apparatus EM, instructs reproduction of desired music content and also selects the automatic score page turning function. Then, a sound signal As having mixed therein an audio signal including control information Cs is transmitted from the electronic music apparatus EM to the music content display apparatus DS in response to reproduction of the music content (music piece data). Thus, the music content display apparatus DS determines, by means of the determination section DC, whether the audio signal included in the received sound signal As satisfies the predetermined reception condition. If the determination section DC has determined that the audio signal included in the received sound signal As satisfies the predetermined reception condition, it means the determination section DC has ascertained that the newly-purchased music content display apparatus DS is in the state capable of receiving, from the electronic music apparatus EM, an audio signal including appropriate control information Cs, which also means that the user possessing the newly-purchased music content display apparatus DS possesses the electronic music apparatus EM suiting the newly-purchased music content display apparatus DS and that security for music content protection has been confirmed. In response to such ascertainment and confirmation, the music content display apparatus DS performs "music content addition process A". In "music content addition process A", "p-r" item or set of music content (i.e., musical score data, i.e. displaying content) that corresponds to any one of p sets of music content (music piece data set) preset or built-in in the electronic music apparatus EM but is other than r sets of music content prestored in the storage section STd is automatically acquired from the server SV via the communication section CM and additionally stored into the storage section STd. Such "p-r" item or set of music content (i.e., "p-r" set of musical score data) thus added to the storage section STd is referred herein to as "additional music content (musical score data set or displaying content)".

Namely, the determination section DC determines whether or not additional acquisition of music content is possible, and once it is determined that the aforementioned predetermined reception condition is satisfied, the determination section DC instructs the additional acquisition section AD to acquire the above-mentioned additional music content (musical score data set) from the server SV. In response to such an instruction, the additional acquisition section AD acquires the above-mentioned (acquisition-instructed) additional music content from the server SV via the communication section CM over the communication network and stores the additional music content into the storage section STd.

The aforementioned first function of the music content display apparatus DS is summarized as follows. The music content display apparatus DS displays musical score data in response to the electronic music apparatus EM reproducing music content (music piece data); however, at an initial stage, only r (p>r≥0) sets of preset music content (musical score data) are prestored in the music content display apparatus DS. The music content display apparatus DS first receives a sound signal As from the electronic music apparatus EM by means of the audio reception section 7 and the demodulation section DM. Then, once the music content display apparatus DS ascertains that it is in the state capable of receiving, from the electronic music apparatus EM, control information Cs included in the audio signal (i.e. that the reception condition is satisfied), it identifies, as "additional music content", an item or set of music content that corresponds to any of p sets of music content (music piece data sets) but is other than the sets of preset music content (reproducing music piece data) and permits acquisition of the additional music content (by means of the determination section DC). Then, the additional acquisition section AD acquires the permitted additional music content (musical score data set) from the server SV and additionally stores the acquired additional music content into the storage section STd. Then, where the score page turning signal Cs1 is used as the control information Cs, the information extraction section EX references the music piece ID information Si and reproduced position information (measure number) Bn extracted from the score page turning signal Cs1, and the display control section CTd reads out, from the storage section STd, the music content (musical score data) corresponding to the extracted music piece ID information Si, the display control section CTd causes the display section 6 to display, on the display screen SC, a musical score portion corresponding to the extracted reproduced position information (measure number) Bn.

[The Second Function of the Music Content Display Apparatus]

In order to perform the aforementioned second function, the music content display apparatus DS performs "music content addition process B" by means of the determination section DC as shown in a functional block diagram of FIG. 5 and thereby updates music content in the non-usable state, included in the music content (musical score data) prestored in the storage section STd, to the usable state.

More specifically, the aforementioned second-type initial storage state where the second function is performed as noted above is a state where p sets of music content (musical score data or displaying content) are also prestored in the storage section STd of the music content display apparatus DS in correspondence with p sets of usable (reproducible) music content (reproducing music piece data) preset or built-in in the data storage section STe of the electronic music apparatus EM, and where s (p>s≥0) sets of music content (musical score data or displaying content) of the prestored p sets of music content are set in the usable (displayable) state while the remaining "p-s" sets of music content (musical score data or displaying content) are set in the non-usable state. In order to perform the second function, a sound signal As including control information Cs is transmitted from the electronic music apparatus EM to the music content display apparatus DS in response to reproduction of music content (music piece data) in a similar manner to the aforementioned. Then, the music content display apparatus DS determines, by means of the determination section DC, whether the received sound signal As satisfies the predetermined reception condition. Once the determination section DC ascertains that the music content display apparatus DS is in the state capable of receiving the control information Cs from the electronic music apparatus EM, the music content display apparatus DS performs "music content addition process B". In "music content addition process B", the determination section DC determines whether sets of music content (musical score data or displaying content) currently stored in the storage section STd are in the usable state or in the non-usable state, and it updates all of the "p-s" sets of music content (musical score data), having been ascertained to be in the non-usable state, to the usable (displayable) state. The "p-s" sets of music content (musical score data) having been thus updated usable state can be said to be "usable additional music content (musical score data)".

Namely, the determination section DC determines whether content in the non-usable state can be changed to the usable state, and once it is determined that the aforementioned predetermined reception condition is satisfied, the determination section DC determines whether the sets of music content (musical score data) currently stored in the storage section STd are in the usable state or in the non-usable state, and it updates all of the sets of music content (musical score data), having been ascertained to be in the non-usable state, to the usable (displayable) state. That the sets of music content (musical score data) having been newly set in the usable (displayable) in the aforementioned manner is equivalent to a situation where the sets of music content (musical score data) having been newly made usable have been added to the storage section STd.

The aforementioned second function of the music content display apparatus DS is summarized as follows. In order for the music content display apparatus DS to display musical score data in response to the electronic music apparatus EM reproducing music content (music piece data), corresponding music content (musical score data set) is prestored in the storage section STd; however, at an initial stage, s sets of music content (musical score data or displaying content) less than the p sets of music content preset in the electronic music apparatus EM ($p>s\geq 0$) are set in the usable state, while the remaining "p-s" sets of music content (musical score data or displaying content) are set in the non-usable state. The music content display apparatus DS first receives a sound signal As from the electronic music apparatus EM by means of the audio reception section 7 and the demodulation section DM. Then, once the music content display apparatus DS ascertains that it is in the state capable of receiving, from the electronic music apparatus EM, control information Cs included in the audio signal (i.e. that the reception condition is satisfied), the determination section Dc updates all of the remaining (p-s) sets of music content from the non-usable state to the usable (displayable) state. Then, the information extraction section EX references the music piece ID information Si and reproduced position information (measure number) Bn extracted from the control information Cs, and the display control section CTd reads out, from the storage section STd, the music content (musical score data) corresponding to the extracted music piece ID information Si, and the display control section CTd causes the display section 6 to display, on the display screen SC, a musical score portion corresponding to the extracted reproduced position information (measure number) Bn.

The determination section DC may issue an instruction for updating all items or sets of music content, stored in the storage section STd, to the usable state. Alternatively, when the information extraction section EX has extracted the model ID information Ki from the model ID signal Cs2, the determination section DC may issue an instruction for updating, to the usable state, only any of the sets of music content, stored in the storage section STd, that corresponds to the extracted model ID information Ki.

[Example Behavior of the Electronic-Audio-Apparatus Cooperating Processing (Music Content Display Processing)]

FIGS. 7A to 10 are flow charts of the electronic-audio-apparatus cooperating processing (music content display processing). Note that "1" shown at a right upper corner of a block of step P1 in FIG. 8 indicates that step P1 can be omitted when the second function is to be performed, and that "2" shown at a right upper corner of a block of step P2 in FIG. 8 and shown at right upper corners of blocks of steps Q3 and Q5 in FIG. 9 indicate that these steps can be omitted when the first function is to be performed.

Figure 7A:
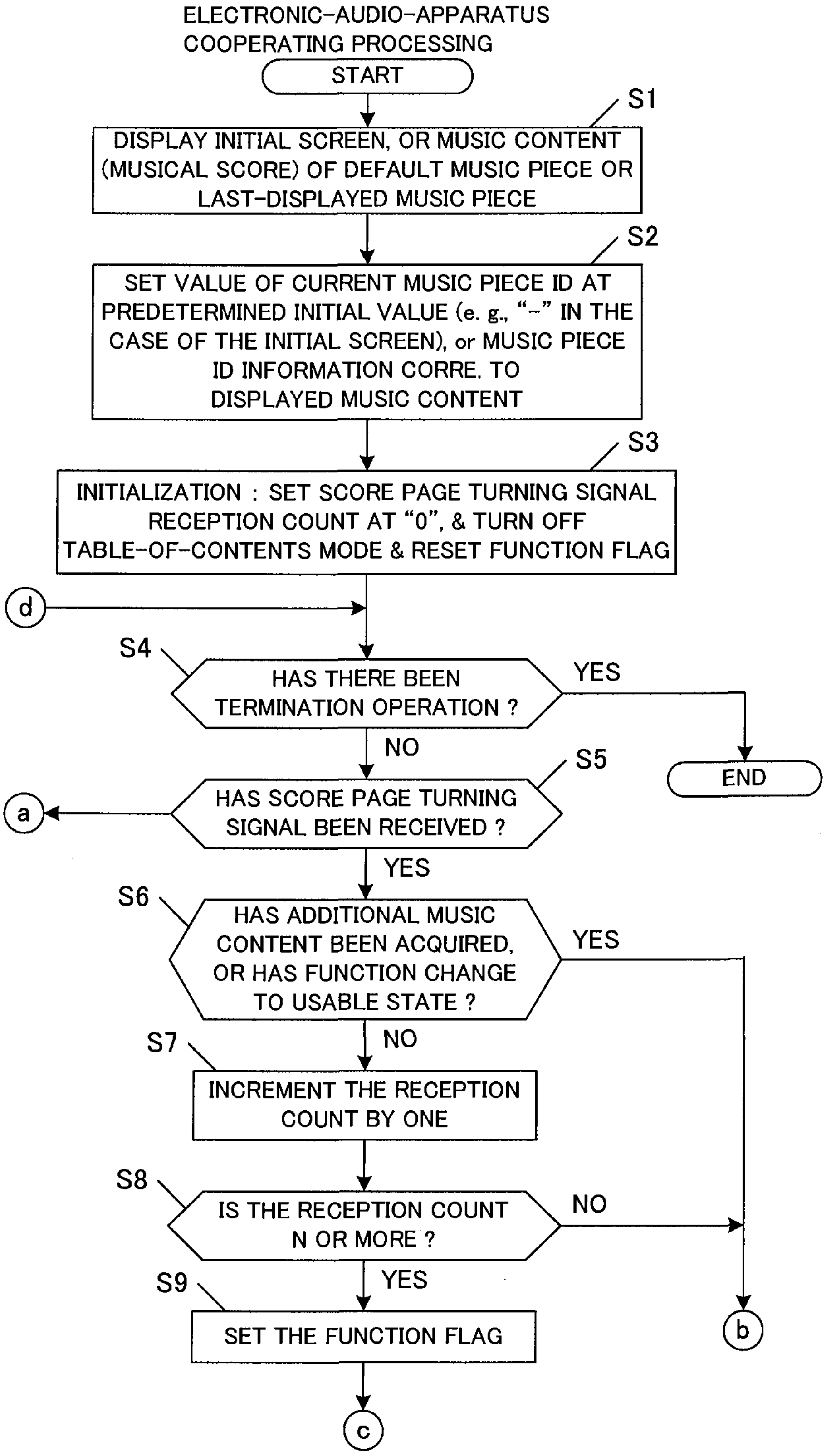
FIG. 7A and FIG. 7B are a flow chart of electronic-audio-apparatus cooperating processing in the embodiment of the present invention.
Figure 7B:
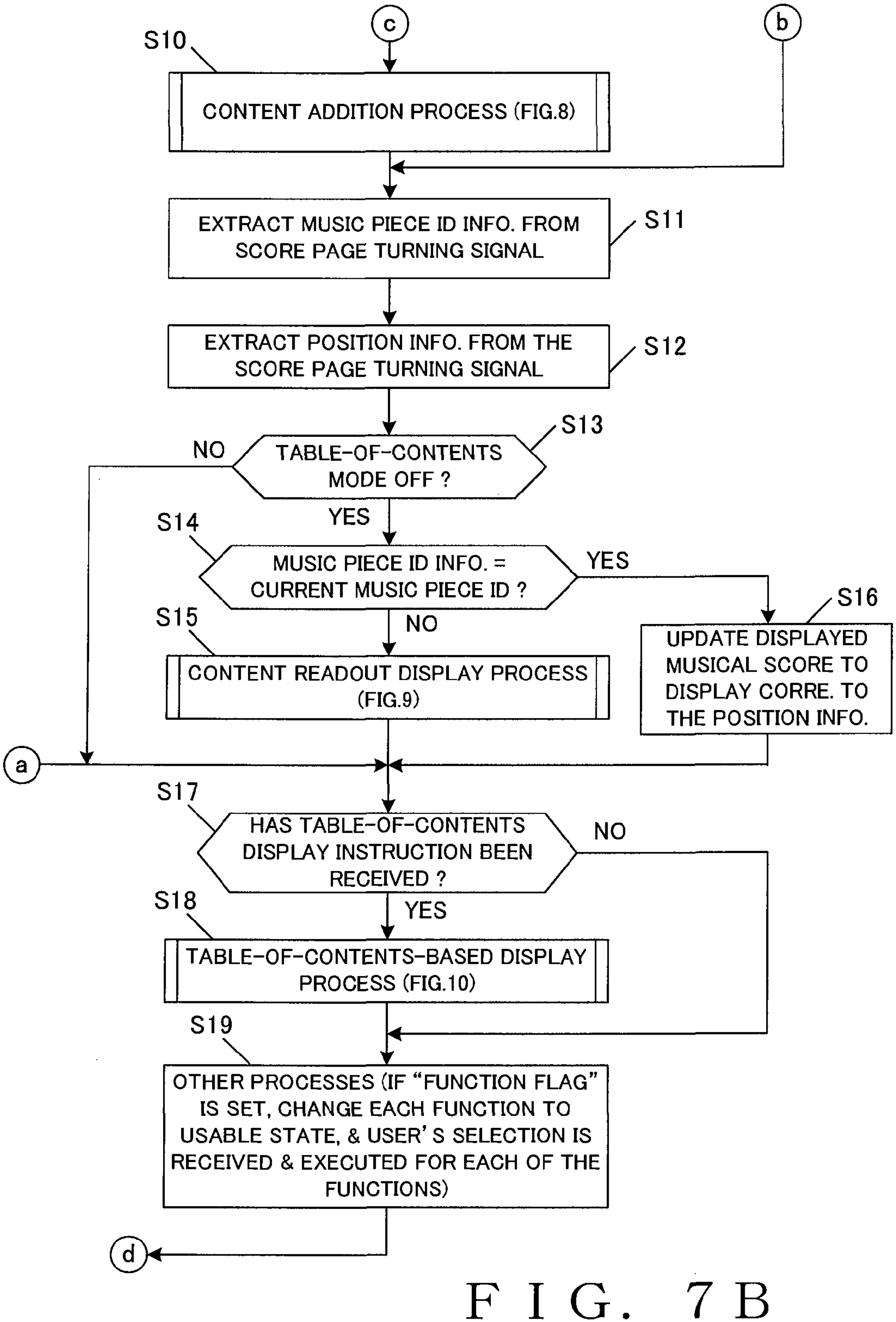

Upon powering-on of the music content display apparatus DS or upon start-up of the music content display processing program, the music content display processing shown in FIGS. 7A and 7B is started up. FIGS. 7A and 7B are interconnected via connection points a, b, c and d. First, at step S1 in FIG. 7A, the CPU 1 displays, on the display screen SC, either a predetermined initial screen or a musical score (music content) of a default music piece or a music piece that was being displayed on the last execution of the music content display processing program. At next step S2, a value of variable "current music piece ID" is set at (1) a predetermined value (not present in music piece ID information Si, such as "-" in the case of an initial screen display), or (2) a value of music piece ID information Si of the music piece corresponding to the currently-displayed musical score. If the music piece ID of a set of music content (music piece data) preset in the electronic music apparatus EM and the music piece ID of a corresponding set of music content (musical score data) stored in the storage section STd differ from each other, the display control may be performed using any one of the two music piece IDs. The "current music piece ID" is a variable indicative of a musical score to be displayed. Then, initialization is performed at step S3, in which, for example, the score page turning signal reception count is set at "0" and the table-of-contents mode is turned off and a function flag is reset.

At step S4, a determination is made as to whether there has been a termination operation. If there has been not been a termination operation as determined at step 4 (NO determination at step S4), the processing proceeds to step S5 to further determine whether a score page turning signal (i.e., control information Cs) has been received.

If a score page turning signal has been received (YES determination at step S4), the processing goes to step 6 to further determine whether additional music content has been acquired, or where a function has already been changed to the usable state. In this case, a content acquisition flag may be set when additional music content has been acquired (step S10 in FIG. 7B) so that the content acquisition can be determined with reference to the content acquisition flag. Alternatively, the content acquisition can be determined with reference to a storage state of the storage section STd. Further, the determination as to whether the function executing program stored in the storage section STd is currently set in the usable state is made by determining whether the function flag is currently in a set state. If additional music content has not been acquired (NO determination at step S6), the processing goes to step S7 to increment the score page turning signal reception count by one. Further, at step S8, a determination is made as to whether the score page turning signal reception count is N (N is an integral number equal to or greater than one) or more. The increment and determination of the score page turning signal reception count is performed in a case where a determination rule is set for effecting additional acquisition once the score page turning signal Cs is received the predetermined number N of times. In a case where another determination rule is set, operations corresponding to the other determination rule are performed (setting of a determination rule at step S19 of FIG. 7B). When the score page turning signal reception count is N or more as determined at step S8 (YES determination at step S8), it is determined that the reception condition has been satisfied, so that the function flag is set at step S9 and then the processing goes to step S10 of FIG. 7B to perform "content addition process" shown in FIG. 8.

Figure 8:
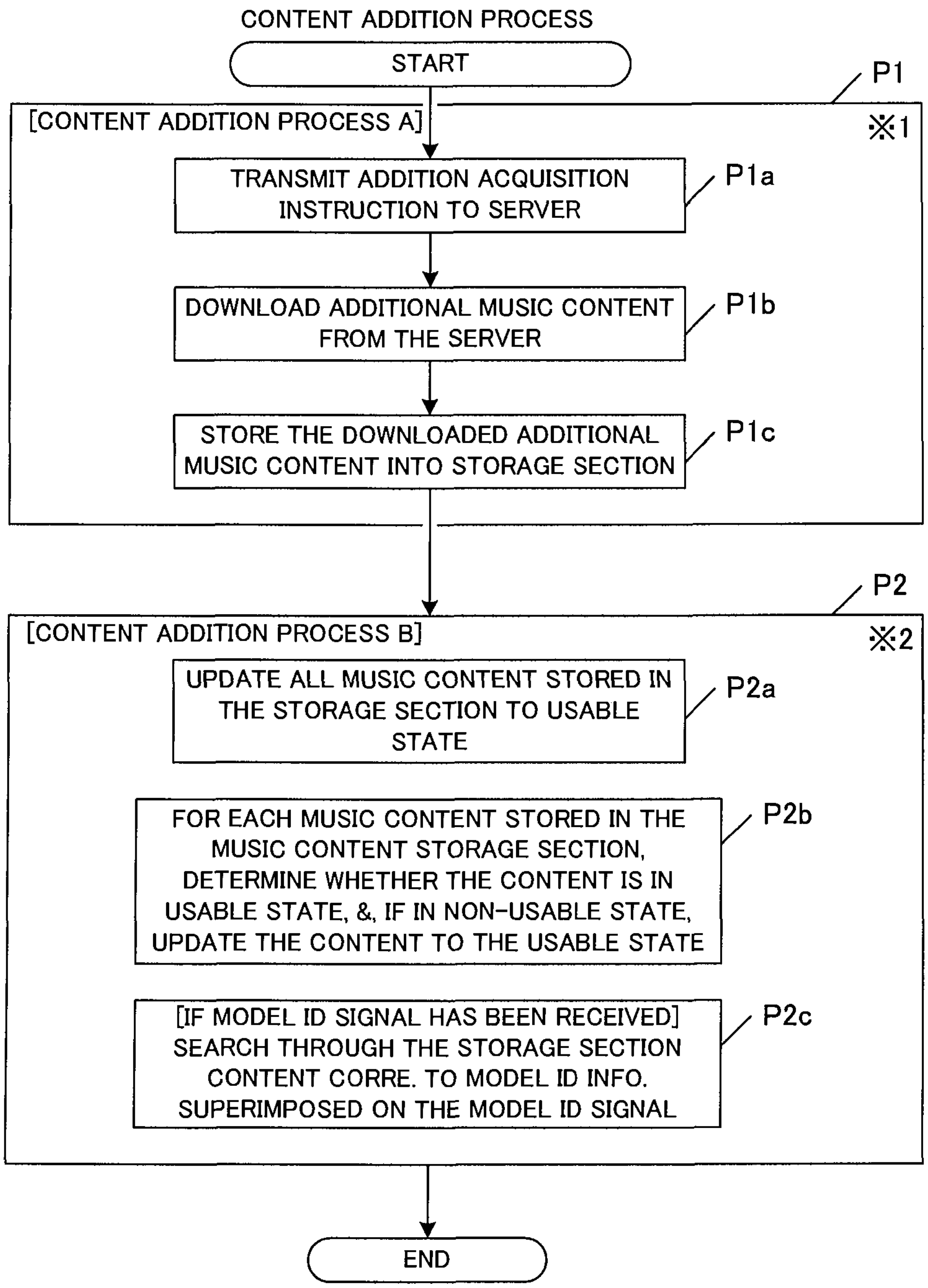
FIG. 8 is a flow chart of a music content addition process in the embodiment of the present invention.
Figure 9:
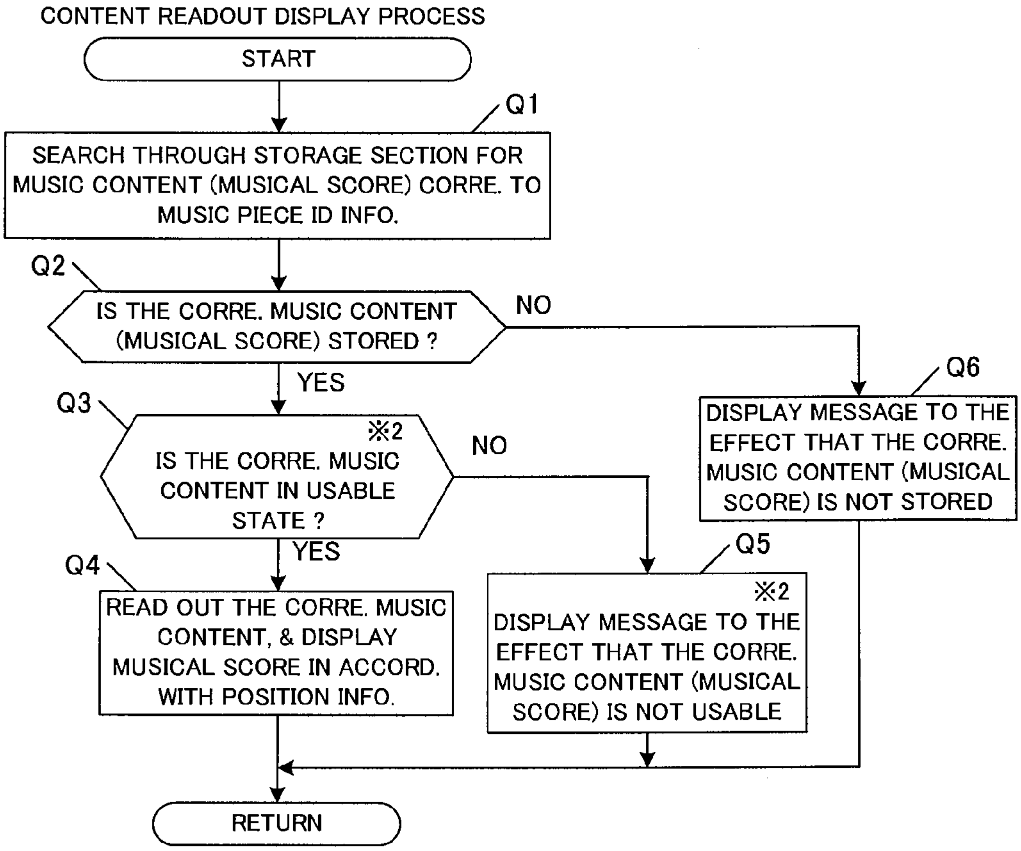
FIG. 9 is a flow chart of a music content readout display process in the embodiment of the present invention.

In the content addition process shown in FIG. 8, when only the first function is to be performed, and if it has been determined that the score page turning signal reception count is N or more as determined at step S8 (YES determination at step S8), acquisition, from the server SV, of additional music content is permitted, so that the additional music content is downloaded from the server SV and stored into the storage section STd of the music content display apparatus DS (music content addition process A); in this case, step P2 is skipped. More specifically, for example, at step P1, a request for transmission of an additional "p-r" set of music content (musical score data or displaying content) from the server SV is automatically issued (first step P1*a*), additional music content is downloaded from the server SV in response to the request (second step P1*b*), and the additional "p-r" set of music content transmitted from the server SV in response to the request is stored into the storage section STd (third step P1*c*).

When only the second function is to be performed, on the other hand, step P1 is skipped, and then, the process goes to step P2, where any one of operations of steps P2*a*, P2*b* and 2*c* is performed as content addition process B; which one of processes of steps P2*a*, P2*b* and 2*c* (or combinations thereof) may be predetermined as an initial setting or the setting as to which one of the operations of steps P2*a*, P2*b* and 2*c* (or combinations thereof) may be changed as necessary. Namely, in first content addition process B at step P2*a*, all items or sets of music content stored in the storage section STd are updated to the usable state. Further, in second addition process B at step P2*b*, 1) a determination is made, for each of the music content stored in the storage section STd, as to whether the music content is in the usable state, and 2), if in the non-usable state, the music content is updated to the usable state. Further, in third content addition process B at step P2*c*, when the model ID signal Dc2 has been received, music content corresponding to the model ID information Ki superimposed on the model ID signal Ds2 is searched out from the storage section STd and updated to the usable state. In this case, if information indicative of correspondency between model ID information Ki and music content is stored separately, then such correspondency information may be referenced. Further, model ID information is stored or included in music content, then a determination is made, for each music content stored in the storage section STd, as to whether the music content corresponds to the model ID, and, if the music content corresponds to the model ID, this music content is updated to the usable state.

Then, once the operations of steps P1 to P2 are completed, the content acquisition flag is set ON in the case where the determination as to whether the additional music content has already been acquired (step S6 of FIG. 7A) is made with reference to the content acquisition flag; otherwise (i.e., the determination as to whether the additional music content has already been acquired is not made with reference to the content acquisition flag), the instant music content addition process is brought to an end, after which control reverts to step S11 of the content display processing flow of FIG. 7B.

If the additional music content has been acquired or the function executing program has been updated to the usable state as determined at step S6 of FIG. 7A (YES determination at step S6), and if the score page turning signal reception count is below N as determined at step S8 (NO determination at step S8), or when the music content addition process at step S10 (FIG. 7B) has been terminated, the processing proceeds to steps S11 and S12. First, the music piece ID information Si is extracted from the score page turning signal Cs at step S11, and the reproduced position information Bn is extracted from the score page turning signal Cs at step S12. Here, a measure number, page number or the like is used as the reproduced position information Bn. Following the extraction of the reproduced position information Bn, the processing proceeds to step S13.

At step S13, a determination is made as to whether the table-of-contents mode is currently set OFF. If the table-of-contents mode is currently set OFF (YES determination at step S13), a further determination is made, at step S14, as to whether the value of the music piece ID information Si extracted at step S11 matches the "current music piece ID". If the music piece ID information Si does not match the current music piece ID as determined at step S14 (NO determination at step S14), the processing goes to step S15 to perform a "content readout display process" shown in FIG. 9.

At first step Q1 of the content readout display process (FIG. 9), the storage section STd is searched for an item or set of music content (musical score data set) corresponding to the music piece ID information Si extracted at step S11 of FIG. 7B, and at next step Q2, a determination is made as to whether the corresponding music content is currently stored in the storage section STd. If the corresponding music content is currently stored in the storage section STd (YES determination at step Q2), a further determination is made, at step Q3, as to whether the corresponding music content is in the usable state. If the corresponding music content is in the usable state (YES determination at step Q3), the process proceeds to step Q4, where the corresponding music content (musical score data set) is read out from the storage section STd, a musical score is displayed on the screen DS in accordance with the reproduced position information Bn extracted at step S12 of FIG. 7B, but also the current music piece ID is set at the music piece ID of the corresponding music content (musical score data set). If on the other hand, the corresponding music content is in the non-usable state (NO determination at step Q3), the process branches to step Q5, where a message to the effect that the music content (musical score data set) is unusable is displayed on the screen SC.

Note that, when only the first function is to be performed, the process skips step Q3 to immediately proceed to step Q4 and does not perform step Q5. Namely, if the corresponding music content is currently stored in the storage section STd (YES determination at step Q2), the process immediately performs the operation of step Q4. If the corresponding music content is not currently stored in the storage section STd (NO determination at step Q2), the process branches to step Q6, where a message to the effect that the corresponding music content (musical score data set) is not currently stored (could not be searched out or found) is displayed on the screen SC. Upon completion of the operation of any one of steps Q4 to Q6, the instant music content readout display process is brought to an end, and control reverts to step S17 (FIG. 7B) of the content display processing flow.

Referring back to FIG. 7B, if the value of the music piece ID information Si extracted at step S11 matches the current music piece ID (YES determination at step S14), the processing goes to step S16 to update the musical score, displayed on the screen SC, to a display corresponding to the reproduced position information Bn extracted at step S12. Further, if no score page turning signal Cs1 has been received as determined at step S5 of FIG. 7A (NO determination at step S5), if the table-of-contents mode is currently set ON as determined at step S13 (NO determination at step S13), or when the operation of any one of steps S15 and S16 has been completed, the processing proceeds to step S17. At step S17, a determination is made as to whether a table-of-contents display instruction given, for example, via the table-of-contents button to of FIG. 6 has been received. If such a table-of-contents display instruction has been received (YES determination at step S17), the processing proceeds to step S18, where a "table-of-contents-based display process" shown in FIG. 10 is performed.

Figures 10, 11:
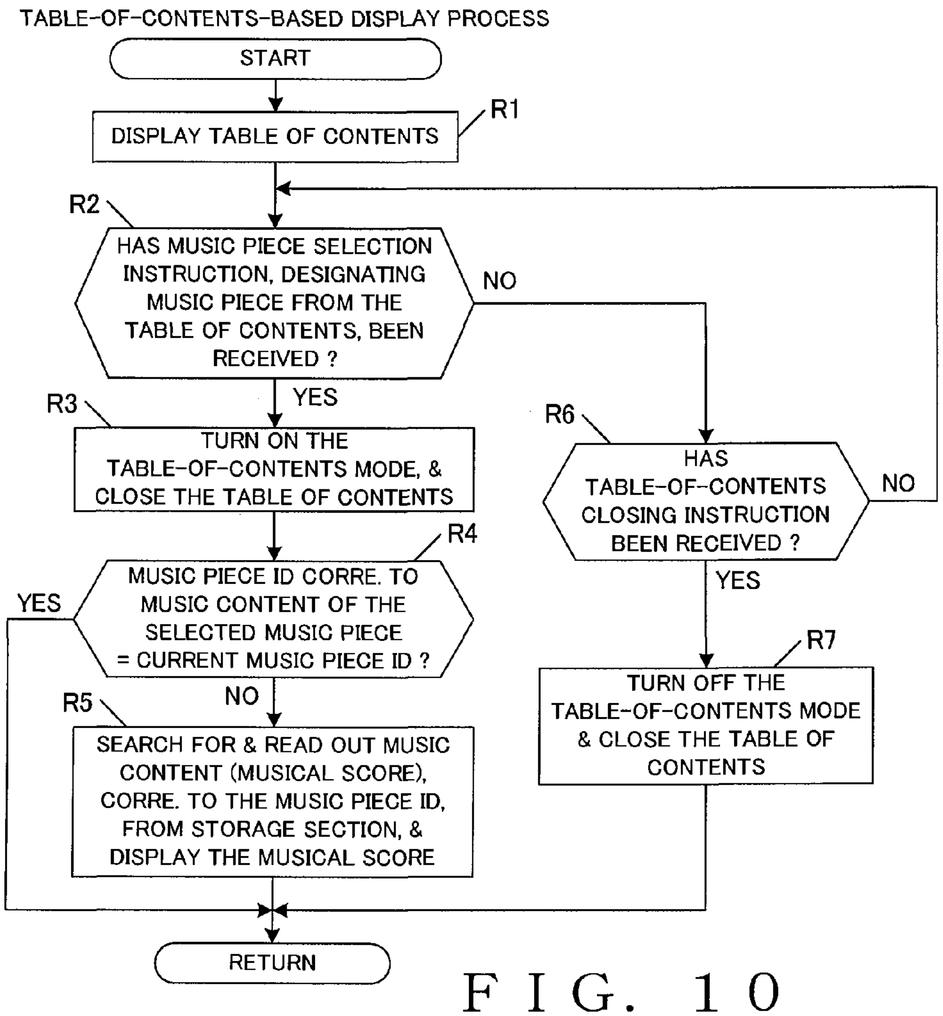
FIG. 10 is a flow chart of a table-of-contents-based display process in the embodiment of the present invention.
FIG. 11 is a diagram showing an example of a function-content correspondency table in the embodiment of the present invention.

In the table-of-contents-based display process of FIG. 10, a table of contents (list of music pieces) is displayed on the display screen SC at first step R1, and then, a determination is made, at step R2, as to whether a music piece name selection instruction, which selects and designates a desired music piece from among a plurality of music pieces, has been received. If such a music piece name selection instruction has been received (YES determination at step R2), the process proceeds to step R3, where the table-of-contents mode is set ON (to set a musical score display independent of the score page turning signal) to close the display of the table of contents, after which the process moves to step R4. At step R4, a determination is made as to whether the music piece ID of the music content (musical score data set) of the selected music piece (hereinafter "music piece ID of the selected music piece") matches the current music piece ID. If the music piece ID of the selected music piece does not match the current music piece ID (NO determination at step R4), the process proceeds to step R5, where the music content (musical score data set) corresponding to the music piece ID is searched for and read out from the storage section STd so that the musical score is displayed but also the music piece ID of the selected music piece is set as the current music piece ID. After that the table-of-contents-based display process of FIG. 10 is brought to an end, upon which control reverts to step S19 (FIG. 7B) of the music content display processing flow.

If, on the other hand, the music piece ID of the selected music piece matches the current music piece ID (YES determination at step R4), the table-of-contents-based display process of FIG. 10 is directly terminated because the musical score represented by the music content (musical score data set) has already been displayed, and control reverts to step S19 (FIG. 7B) of the content display processing flow. Further, if a music piece name selection instruction has not been received (NO determination at step R2), the process branches to step R6. At step R6, a determination is made as to whether an instruction for closing the table of contents had been received, and, if such an instruction for closing the table of contents has not been received (NO determination at step R6), control reverts to step R2 to wait for reception of a music piece name selection instruction. Once such a music piece name selection instruction is received (YES determination at step R2), the operations of steps R3 to R5 are performed. However, if an instruction for closing the table of contents has been received without a music piece name selection instruction being received (YES determination at step R6), the table-of-contents mode is turned off to close the table of contents at step R7, and then the table-of-contents-based display process of FIG. 10 is brought to an end, upon which control reverts to step S19 (FIG. 7B) of the content display processing flow.

Referring back to FIG. 7B, if a table-of-contents display instruction has not been received (NO determination at step S17), or when the table-of-contents-based process at step S18 has been brought to an end, other processes are performed at step S19. The other processes include, among other things, switching between ON/OFF settings of the table-of-contents mode (e.g., when the user wants to turn off the table-of-contents mode to switch to a musical score display based on a score page turning signal, without the table of contents is being displayed, from a state where a musical score selected from the table of contents is being displayed with the table-of-contents mode set ON), adjustment of the display screen SC, and setting of a reception condition determination rule at steps S7 and S8. Further, if the "function flag" is currently set, it is determined that the individual functions based on the function executing programs have been set in the usable state, so that selection by a user's operation is received and executed for each of the functions having been set in the usable state. Namely, on the example of the display screen SC shown in FIG. 6, the print button pr and the layout button yt are displayed in a highlighted fashion, and the "print" and "layout" functions having so far been in the non-usable state are set in the usable state. Thus, once the print button pr is operated, for example, a print dialog is displayed, so that, once a user's operation is performed on the print dialog, the printer connected to the print output section is caused to print a musical score corresponding to the user's operation. Once the layout button yt is operated, a number-of-pages dialog is displayed, so that, once a user's operation is performed on the number-of-pages dialog, musical scores of a user-selected number of pages are simultaneously displayed on the display screen SC.

Upon completion of the other processes of step S19, the processing reverts to step S4 to repeat the aforementioned operations of steps S4 to S19. Then, once it is determined at step S4 that there has been a termination operation (YES determination at step S4), the instant music content display processing is brought to an end.

In the above-described electronic-audio-apparatus cooperating processing (music content display processing), the score page turning signal Cs1 is used at step S5, S7 and S8 as the control information Cs for determining whether the reception condition is satisfied. Alternatively, if music content readout and display operations (steps S11 to S16) using the score page turning signal Cs1 are not performed, the determination as to whether the reception condition is satisfied may be made using the model ID signal Cs2 as the control information Cs.

[Various Modifications and Supplementary Notes Related to the Second Function]

Whereas the music content display system has been described above as an embodiment of the electronic-audio-apparatus cooperating system of the present invention with reference to the accompanying drawings, the present invention is not so limited. Various modifications of the embodiment are of course possible, and various advantageous benefits are achievable. For example, a plurality of types of sets of music content of musical score data (corresponding, for example, to performance skill levels of users of the electronic music apparatus) may be prestored in relation to a music piece or music piece data set. Furthermore, musical score data constituting a set of music content may comprise any form of data, such as musical score logical data, image data, or the like. In the case where the musical score data comprise musical score logical data, for example, musical score displaying data are generated on the basis of the musical score logical data at the time of displaying of the musical score.

Further, the control information Cs contained in (carried by) the audio signal received from the electronic music apparatus only has to include at least information, such as a music piece ID, capable of identifying a set of music content to be displayed.

When a user has purchased an electronic music apparatus (electronic musical instrument), having sets of music content (reproducing music piece data) preset or built-in therein, together with a music content display program and one or more sets of music content (displaying music-piece-associated data, such as musical score data and music-piece guiding illustration data) at least a part of which is in the non-usable state, the music content display apparatus can display sets of music content (displaying music-piece-associated data), corresponding to all of the sets of music content (music piece data) built-in in the user-purchased electronic music apparatus, by updating each set of music content (displaying music-piece-associated data), set in the non-usable state and corresponding to sets of music content (music piece data) reproduced by the electronic music apparatus, to the usable state automatically or in response to only a simple user's operation. In this way, it is possible to enhance the additional value of the system. In addition, security of the sets of music content (displaying music-piece-associated data, such as musical score data) can be secured.

In the above-described embodiment, a set of music content (musical score) indicated by the music piece ID information, identifying a particular set of music content and contained in the score page turning signal, can be displayed. Further, a set of music content (musical score) selected through a user's selection operation on the music content display apparatus can also be displayed.

Although the timing at which the music content display apparatus should update music content in the non-usable state to the usable state may be when a score page turning signal has been received for the first time, such timing may also be when it could be ascertained for the first time that the music content display apparatus has been in a communicating state with the electronic music apparatus (that is a transmitting end of the score page turning signal) for a predetermined time period corresponding, for example, to a predetermined number of seconds or a predetermined number of times of score page turning signal reception.

In order to determine, for each set of music content (musical score data) or function executing program, whether the music content (musical score data) or function executing program is in the usable state, usable-state flag information may be provided for each set of music content or function executing program. Alternatively, for each set of music content or function executing program, an extension differing depending on whether the set of music content or function executing program is in the usable state or not may be stored. As another alternative, information indicating, for each set of music content or function executing program, whether the music content or function executing program is in the usable state may be recorded in a non-displayed (invisible to the user) table. Alternatively, all sets of music content non-usable in the initial state may be encoded, and they may be automatically decoded and stored in response to receipt of a control signal (score page turning signal) from the electronic music apparatus. As still another alternative, all sets of music content non-usable in the initial state may be simply put together in a particular folder, and, in response to receipt, from the electronic music apparatus, of a signal satisfying a predetermined condition, the sets of music content may be moved from the particular folder to appropriate locations in the storage section STd.

Whereas, in the above-described embodiment, the above-mentioned signal satisfying the predetermined condition, which the music content display apparatus (electronic-audio-apparatus cooperating apparatus) DS receives from the electronic music apparatus (electronic audio apparatus) EM, is the audio signal carrying the control information, the present invention is not so limited. For example, a given set of music piece content (of a demonstration music piece or the like) built-in the electronic music apparatus may be reproduced and directly sounded as an audio signal through the speaker of the electronic music apparatus, and then the music content display apparatus may receive the audio signal, analyzes the received audio signal over several measures and consequently determines that the predetermined condition has been satisfied when the analyzed audio signal could be identified to be of a particular set of music piece content (of the demonstration music piece or the like).

Whereas the preferred embodiment has been described above in relation to the case where it performs only the first function or the second function, the music content display apparatus may perform both of the first and second functions in a combined manner. For example, assume a case where p sets of usable music content (reproducing music piece data) are preset in the electronic music apparatus while q (less than p, i.e. p>q) sets of music content (displaying music-piece-associated data) are prestored in the music content display apparatus, and where s sets of the q sets are set in the usable state while the remaining (q-s) sets are set in the non-usable state. In such a case, there may be employed a combination of the first and second functions such that, when a state capable of communicating with the electronic music apparatus has been confirmed, the music content display apparatus acquires "p-q" sets of usable music content (displaying music-piece-associated data) from the server and updates the (q-s) sets, currently set in the non-usable state, to the usable state.

[Other Example of the Electronic-Audio-Apparatus Cooperating Apparatus]

Figure 12:
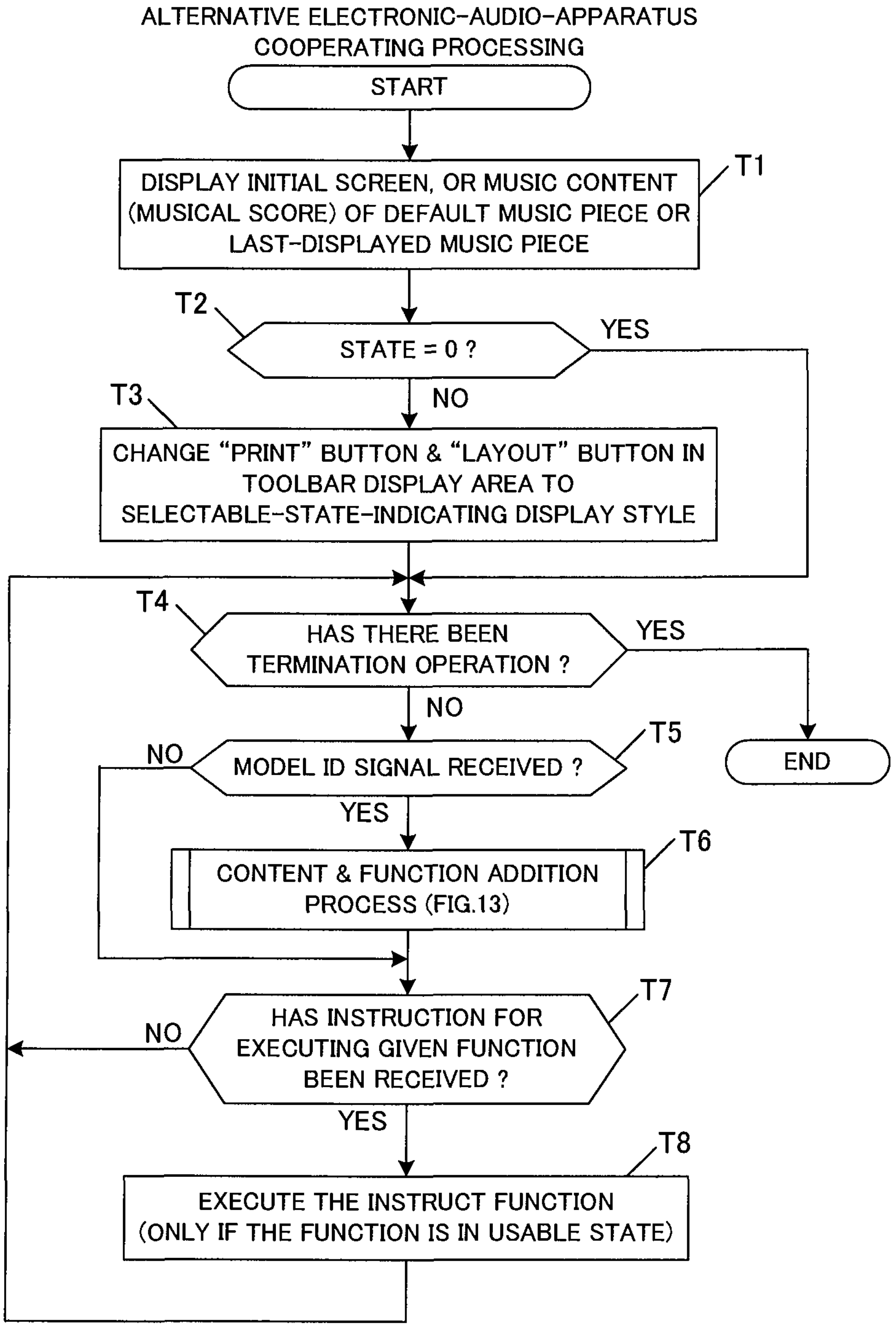
FIG. 12 is a flow chart of another example of the electronic-audio-apparatus cooperating processing in the embodiment of the present invention.
Figure 13:
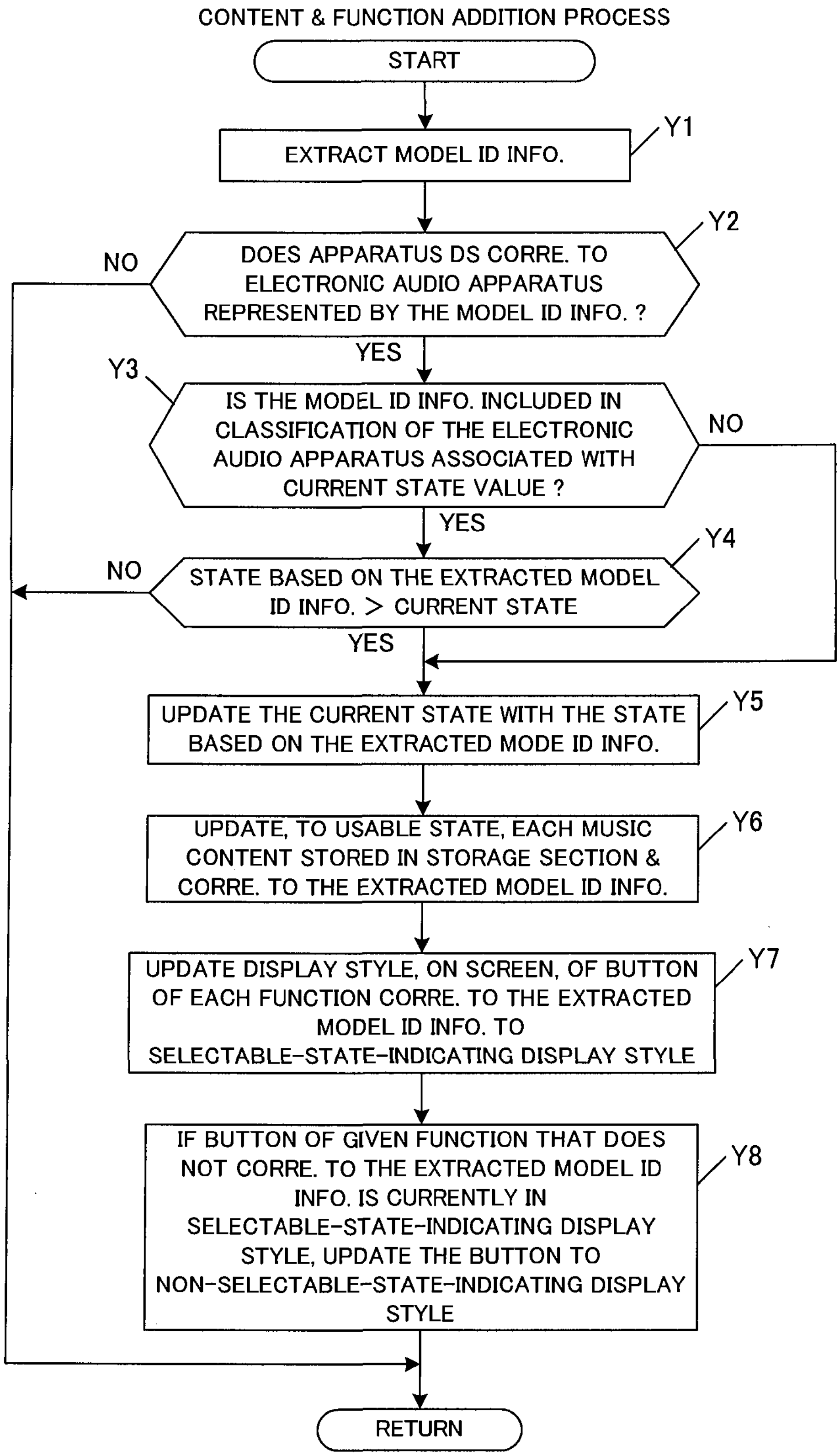
FIG. 13 is a flow chart of a content and function addition process in the embodiment of the present invention.

According to another or alternative example of the electronic-audio-apparatus cooperating processing of the present invention, a predetermined set of music content and function can be made usable in response to receipt of the model ID signal Cs2. FIGS. 11 to 13 are diagrams explanatory of such an alternative example of the electronic-audio-apparatus cooperating processing. In the alternative example of the electronic-audio-apparatus cooperating processing, the model ID signal Cs2 is used as the control information Cs for determination as to whether the predetermined reception condition is satisfied. Namely, once it is determined that the reception condition has been established, a set of music content and function (i.e., function executing program) corresponding to model ID information Ki represented by the model ID signal Cs2 are made usable. Such an arrangement can set or place a set of music content and functions in the usable state in a stepwise fashion in accordance with ranks of models (model ranks) of electronic music apparatus EM, such as an upper-level model. Further, when particular model ID information Ki has been received from the electronic music apparatus EM, the above arrangement can place music content and functions unique specific to the electronic music apparatus EM in the usable state.

In the alternative example of the electronic-audio-apparatus cooperating processing (i.e., alternative electronic-audio-apparatus cooperating processing), a variable STATE indicative of a model rank (or model level) of the cooperating-with electronic music apparatus EM. Further, a current STATE value is stored in the storage section STd of the storage device 4 of the electronic-audio-apparatus cooperating apparatus DS in association with a classification (referred to also as "model ID" or "series") of the electronic music apparatus EM, and the STATE value at the time of installation of the electronic-audio-apparatus cooperating processing program is "0" (zero). Further, a "function-content correspondency table" Tk defining correspondency among model ranks (STATEs), functions and sets of music content of electronic music apparatus EM is stored per series of electronic music apparatus EM in the storage section STd. At the time of execution of the electronic-audio-apparatus cooperating processing program, sets of music content and functions corresponding to a stored STATE value can be used in accordance with the function-content correspondency table Tk. Namely, once the model ID signal Cs2 is received from the electronic music apparatus EM and then the model rank of the electronic music apparatus EM is identified on the basis of the model ID information Ki extracted from the received model ID signal Cs2, sets of music content and functions corresponding to the identified model rank can be made usable (placed in the usable state). At the time of termination of the electronic-audio-apparatus cooperating processing program, the STATE value representing the model rank of the electronic music apparatus EM is stored in association with the classification of the electronic music apparatus EM. Then, at the time of next execution of the electronic-audio-apparatus cooperating processing program, the sets of music content and functions corresponding to the stored STATE value can be used, and, once a model ID signal Cs2 is received from an electronic music apparatus EM of an upper-level model, the stored STATE value is updated with a STATE value corresponding to the upper-level model.

FIG. 11 shows an example of the function-content correspondency table Tk pertaining to model ranks of electronic audio apparatus EM of series "A". Let it be assumed here that the series "A" electronic music apparatus EM include a dissemination model having a model ID value "XXX01" and an upper-level model having a model ID value "XXX02"; here "X" represents an arbitrary numerical value. In the function-content correspondency table Tk of FIG. 11, there are three different model ranks. The uppermost field in the table is for the first model rank and indicates an initial state (model ID="-" (no data)) at the time of installation of the program when a model ID signal CS2 has not yet been received. Further, in the uppermost field for the first model rank, the STATE value is "0", in which case the functions of the "table-of-contents" and "help" buttons ta and hp are usable on the display screen SC (FIG. 6) and sets of music content having content code Nos. "A-001"-"A-010" are usable.

The middle field in the table is for the second model rank and indicates a state corresponding to the dissemination level of the electronic music apparatus EM. In the middle field for the second model rank, the model ID value is "XXX01" and the STATE value is "1", in which case the functions of the "table-of-contents", "help", "print" and "layout" buttons ta, hp, pr and rt are usable on the display screen SC (FIG. 6). For the "layout", a function for switching the number of pages, simultaneously displayable in the musical score display area of the display screen SC, between two numbers of page, i.e. one page and two pages, is usable. Further, sets of music content having content code Nos. "A-011"-"A-100" are usable.

The lowermost field in the table is for the third model rank and indicates a state corresponding to the upper-level model of the electronic music apparatus EM. In the lowermost field for the third model rank, the model ID value is "XXX02" and the STATE value is "2", in which case the functions of the "table-of-contents", "help", "print" and "layout" buttons ta, hp, pr and rt are fully usable on the display screen SC (FIG. 6). For the "layout", a function for switching the number of pages, simultaneously displayable in the musical score display area of the display screen SC, among three numbers of page, i.e. one page, two pages and four pages, is usable. Further, sets of new-version music content having content code Nos. "A'-011"-"A'-100" are usable.

A function-content correspondency table Tk similar to that shown in FIG. 11 is provided for electronic audio apparatus EM of each of other series. For the model rank in the function-content correspondency table Tk, the series "A" electronic audio apparatus EM can be identified by checking only the upper three digits "XXX" of the model ID. Two model ranks (indicated in the uppermost and lowermost fields of the table) may be provided such that sets of music content and functions (lowermost field in FIG. 11) for the series "A" of electronic audio apparatus EM are all made usable, or three or more model ranks may be provided such that the STATE value is set at any one of "0", "1", "2", "3", . . . .

FIGS. 12 and 13 are flow charts of the alternative example of the electronic-audio-apparatus cooperating processing (i.e., alternative electronic-audio-apparatus cooperating processing). Note, however, that operations responsive to reception of the score page turning signal Cs1 are omitted from FIGS. 12 and 13 for simplicity of illustration and description. In FIG. 12, once the "alternative electronic-audio-apparatus cooperating processing" is started upon powering-on of the electronic-audio-apparatus cooperating apparatus DS or upon activation of an "alternative electronic-audio-apparatus cooperating processing program", the CPU 1 displays, at first step T1, an initial screen, or music content (musical score) of a default music piece or last-displayed music piece, on the display screen SC (FIG. 6) of the display section 6. On the screen, the "table-of-contents" button to and the "help" button hp are displayed in the toolbar display area in a display style indicating a selectable state, while the "print" button pr and the "layout" button yt are displayed in the toolbar display area in a display style indicating a non-selectable state. The current STATE value is set at any one of "0", "1" and "2" and stored in the storage section STd in association with the classification (machine ID or series) of the electronic audio apparatus EM.

At next step T2, a determination is made as to whether the current STATE value is "0" or not. If the current STATE value is not "0" (NO determination at step T2), the processing proceeds to step T3, where the "print" button pr and the "layout" button yt located in the toolbar display area are changed to the display style indicating the selectable state (i.e., selectable-state-indicating display style). If the current STATE value is "0" (YES determination at step T2), or following the display style changing operation of step T3, the processing goes to step T4, where as determination is made as to whether there has been a termination operation. If there has not been a termination operation (NO determination at step T4), the processing goes to step T5. At step T5, a determination is made as to whether a model ID signal Cs2 has been received while satisfying the predetermined reception condition (as in the route of YES determination at step S5→step S7→YES determination at step S8). If a model ID signal cs2 has been received under the predetermined reception condition (YES determination at step T5), the processing proceeds to step T6, where a “content and function addition process” shown in FIG. 13 is performed.

In the content and function addition process of FIG. 13, the model ID information Ki is extracted from the model ID signal Cs2 at step Y1. Then, at step Y2, a determination is made as to whether the electronic-audio-apparatus cooperating apparatus DS corresponds to the electronic audio apparatus EM represented by the extracted model ID information Ki, i.e. whether there has been prepared or stored a function-content correspondency table Tk corresponding to the electronic audio apparatus EM. If such a function-content correspondency table Tk corresponding to the electronic audio apparatus EM has not been stored (NO determination at step Y2), this content and function addition process is immediately brought to an end, and control reverts to step T7 of the alternative electronic-audio-apparatus cooperating processing of FIG. 12.

If the function-content correspondency table Tk corresponding to the electronic audio apparatus EM has been provided (YES determination at step Y2), the process goes to step Y3, where a determination is made as to whether the extracted model ID information Ki is included in the classification of the electronic audio apparatus EM associated with the current STATE value. If answered in the affirmative (YES determination at step Y3), the process proceeds to step Y4, where a determination is made as to whether the STATE value based on the extracted model ID information Ki is greater than the current STATE value. If the STATE value based on the extracted model ID information Ki is equal to or smaller than the current STATE value (NO determination at step Y4), the content and function addition process is brought to an end, and control reverts to step T7 of the alternative electronic-audio-apparatus cooperating processing of FIG. 12.

If the extracted model ID information Ki is not included in the classification of the electronic audio apparatus EM associated with the current STATE value (NO determination at step Y3), or if the STATE value based on the extracted model ID information Ki is greater than (or exceeds) the current STATE value (YES determination at step Y4), the process proceeds to steps Y5 to Y8. First, at step Y5, the current STATE value is updated with the STATE value based on the extracted model ID information Ki. Then, at step Y6, each set of music content stored in the storage section STd and corresponding to the extracted model ID information Ki is updated to the usable state in accordance with the function-content correspondency table Tk. Note that, depending on the specifications, the set of music content of a different version having already been in the usable state (e.g., “A-011”) may be placed in the non-usable state when the STATE value has got greater than the current STATE value; in such a case, a set of music content of an A' series (e.g., “A'-011”) is set in the usable state. Further, at step Y7, the display style, on the display screen SC, of the button of each of the functions corresponding to the extracted model ID information Ki is updated to the selectable-state-indicating display style. Then, at step Y8, if the button of a given button that does not correspond to the extracted model ID information Ki is currently in the selectable-state-indicating display style on the display screen SC, that button is updated to the non-selectable-state-indicating display style. After that, the content and function addition process is brought to an end, and control reverts to step T7 of the alternative electronic-audio-apparatus cooperating processing of FIG. 12.

Once the content and function addition process of step T6 is brought to an end, the processing proceeds to step T7, where a determination is made as to whether an instruction for executing a given function has been received. If an instruction for executing a given function has been received (YES determination at step T7, the given function is executed only if the given function is currently in the usable function. For example, if the “table-of-contents” button to has been operated, the table-of-contents is displayed to allow the user to select a musical score to be displayed next; if the “help” button hp has been operated by the user, a printing dialog is displayed so that printing is performed in response to a user’s operation; and if the “layout” button yt has been operated, a list of the numbers of pages to be simultaneously displayed is displayed to allow the user to select a desired one of the numbers of pages, a display layout is switched in accordance with the selected number of pages, and a score page turning (display updating) instruction is given in response to a user’s touch operation on a portion on the displace screen near the page number pg.

Namely, when model ID information Ki indicative of a given model of which “print” and “layout” functions are usable has been received, new functions, i.e. “print” and “layout” functions, are made usable in addition to default usable functions, i.e. “table-of-contents” and “help” functions. If the received model ID information Ki has been determined to indicate a model for a beginner level, then a display of the “layout” function is presented in such a manner that switching can be made between one page and two pages. Further, if the received model ID information Ki has been determined to indicate a model for an intermediate level or above, then the display of the “layout” function is presented in such a manner that switching can be made not only between one page and two pages but also among four pages. Namely, even for the same function, fineness of an executable function is differentiated among different levels of the model information. Further, until it is determined that model ID information Ki has been received, the print button pr and the layout button yt located beside the table-of-contents button to of FIG. 6 are displayed in the non-selectable-state indicating display style; in this case, the functions of the print button pr and the layout button yt are not actually selectable or executable. By the receipt of the model ED information Ki, the print button pr and the layout button yt are changed to the selectable-state-indicating display style and to the usable state capable of accepting or receiving a user’s selection operation. Conversely, if any button of a given function that does not correspond to the model of the electronic audio apparatus has been changed, by the receipt of the model ED information Ki, to the selectable-state-indicating display style, then that button may be re-changed to the non-selectable-state-indicating display style so that the given function is changed to a non-selectable or non-executable state.

Further, if an instruction for executing a given function has not been received (NO determination at step T7), or following the function execution at step T8, the processing reverts to step T4 to repeat the operations of steps T4 to T8. If there has been a termination operation (YES determination at step T4), the alternative electronic-audio-apparatus cooperating processing is brought to an end.

Note that step Y6 of the content and function addition process of FIG. 13 may be modified to merely update a “set of music content in the non-usable state” to the usable state, step Y7 of the content and function addition process too may be modified to merely update a “button in the non-selectable-state indicating display style" to the selectable-state indicating display style, and the operation of step Y8 may be dispensed with.

The above-described alternative electronic-audio-apparatus cooperating processing may be said to provide a mechanism where a plurality of types of music content and function executing programs are prestored in the storage section STd, for example, in association with proficiency levels of users and assumed levels of users of cooperating-with electronic audio apparatus EM, and where selected ones of the sets of music content and function executing programs are made usable, for example, in accordance with levels of users (corresponding to model levels or ranks of electronic audio apparatus EM). Namely, referring to the functional block diagram of FIG. 5, model identification information Ki, such as a model ID (including version information of the model), capable of identifying a model of an electronic audio apparatus EM is included in the control information Cs (=model ID signal Cs2). When the determination section DC has determined that the reception condition is satisfied (YES determination at step T5), a level of the electronic audio apparatus EM is determined or identified, at step Y4, from the machine ID extracted by the information extraction section EX at step Y1 of FIG. 13, and one or more sets of music content and/or one or more functions belonging to a model corresponding to the identified level are updated to the usable state at steps Y5 to Y8. Thus, for example, if the beginner level is identified, types of music content and function executing programs corresponding to the beginner level can be collectively placed in the usable state.

When the determination section DC has determined that the reception condition is satisfied, only function executing programs in the non-usable state may be updated to the usable state, and sets of music content stored in the storage section STd too may be updated to the usable state. Here, if a given set of music content is in the usable state, the user can select that set of music content in the usable state on the electronic-audio-apparatus cooperating apparatus DS and make the selected set of music content a subject of execution of a function, such as a display and/or print function. Further, if a given function is in the usable state, the user can select the given function in the usable state on the electronic-audio-apparatus cooperating apparatus DS and execute or activate the selected function.

[Summary Pertaining to Change of Content and/or Function Executing Program]

In the preferred embodiment of the electronic-audio-apparatus cooperating system, information superimposed on an audio signal received from the electronic audio apparatus EM only has to include content identification information Si, such as a music piece ID, capable of identifying a set of music content, or model identification information, such as a model ID, capable of identifying the model of the electronic audio apparatus that is a transmission source of the audio signal, as noted above in relation to the preferred embodiment. Alternatively, the information superimposed on the audio signal received from the electronic audio apparatus may include both of the music piece ID and the model ID.

By the electronic-audio-apparatus cooperating apparatus DS additionally updating a set of content and a function executing program, provided in correspondence with the cooperating-with electronic audio apparatus EM, it is possible to enhance the additional value of the electronic audio apparatus EM purchased by the user.

In the preferred embodiment electronic-audio-apparatus cooperating system, as set forth above, the electronic-audio-apparatus cooperating apparatus DS includes, in the storage device 4, the storage section (STd) storing sets of music content and/or function executing programs. Once a sound signal As containing control information Cs2 is received, by means of the audio reception section 7 and the demodulation section DM, from the cooperating-with electronic audio apparatus EM, a determination is made as to whether the control information Cs superimposed on the sound signal As satisfies the predetermined condition ((1) (2), or the like) (by means of the demodulation section DM and determination section DC at steps S5 to S8, and T5). Once it is determined that the predetermined condition is satisfied (YES determination at step S8 and YES determination at step T5), sets of music content and/or function executing programs stored in the storage section STd and set in the non-usable state are updated to the usable state (by means of the determination section DC at steps S19 and T6 (Y5 to Y8)). Here, at least content identification information Si capable of identifying a set of music content may be included in the control information Cs (=score page turning signal Cs1), and, once the content identification information Si is extracted from the control information Cs (by means of the extraction section EX at step S11), a set of content corresponding to the extracted content identification information Si may be read out from the storage section STd (by means of the display control section CTd at step S15. Further, one or more types of music content and/or function executing programs may be stored in the storage section STd, and at least model identification information (model ID information) Ki capable of identifying a model of the cooperating-with electronic audio apparatus EM may be included in the control information Cs (=machine ID signal Cs2). In such a case, once the reception signal is satisfied (YES determination at step T5), the model identification information Ki is extracted from the control signal Cs2 (by means of the extraction section EX at step T6 (Y1)), and only each set of content and/or function of a type corresponding to the extracted model identification information Ki and currently set in the non-usable state may be updated to the usable state (by means of the determination section DC at step T6 (Y5 to Y8)).

[Various Modifications and Supplementary Notes]

Whereas the preferred embodiment of the invention has been described above with reference to the accompanying drawings, the present invention is not so limited, and various modifications are of course possible. For example, the aforementioned various programs may be implemented as microprograms executed by a DSP (Digital Software Processor) rather than computer software, or these processing may be implemented as dedicated hardware apparatus including discrete circuits or integrated circuitry or large-scale integrated circuitry, etc.

Further, the preferred embodiment of the invention has been described above in relation to the case where the external electronic audio apparatus EM sounds audio signals as sound waves through a speaker and the electronic-audio-apparatus cooperating apparatus DS receives the audio signals via a microphone. However, the present invention is not so limited, and communication (transmission and reception) of audio signals between the electronic audio apparatus EM and the electronic-audio-apparatus cooperating apparatus DS may be performed either in a wired manner or in a wireless manner using another form of media than sound waves.

Further, the preferred embodiment of the invention has been described above as sounding, through a speaker, a signal having an audio signal superimposed on a tone signal. However, the present invention is not so limited, and all sounds generated from the electronic audio apparatus EM, such as a singing voice input to a microphone, an operating sound generated as a setting operator is operated by a user, an alarm sound generated at the time of occurrence of an error, etc. may be sounded together through the speaker. Namely, any types of sounds may be output from the speaker as long as an audio signal is output from the speaker.

Further, in consideration of a possible case where even a non-purchaser of the electronic audio apparatus (EM) can obtain the electronic-audio-apparatus cooperating apparatus (DS) and electronic-audio-apparatus cooperating program, it is preferable that the electronic-audio-apparatus cooperating program be designed to permit use of minimum functions and minimum sets of music content of sets of music content and minimum originally stored in the electronic-audio-apparatus cooperating apparatus (DS). Namely, a provider of the electronic audio apparatus (EM) (such as an electronic musical instrument) wants a purchaser of the electronic audio apparatus (EM) to use, as a part of the value or benefit of the electronic audio apparatus (electronic musical instrument), all items or sets of music content (displaying music-piece-associated data) corresponding to sets of music content (reproducing music piece data) recorded therein as built-in music pieces, and thus, when control information from the electronic audio apparatus could be received once or more times, the user operating the electronic-audio-apparatus cooperating apparatus (DS) may be regarded as a purchaser of the electronic audio apparatus (electronic musical instrument) so that all lacking (additional) music content (music-piece-associated data) originally stored in the electronic-audio-apparatus cooperating apparatus (DS) but in the non-usable state can be updated to the usable state.

The electronic-audio-apparatus cooperating system of the present invention is modifiable variously. For example, in the electronic-audio-apparatus cooperating system, the cooperating-with electronic audio apparatus (EM) may be any other apparatus than the above-described electronic musical instrument or electronic music apparatus, such as AV (Audio-Video) equipment that outputs an audio signal, PA equipment, a television receiver, or the like. and the electronic-audio-apparatus cooperating apparatus (DS) may be any other apparatus than the above-described music content display apparatus (musical score display apparatus), such as a recording apparatus, a game apparatus, a training apparatus, a music piece data editing apparatus, an automatic accompaniment apparatus, or the like.

Whereas the preferred embodiment of the electronic-audio-apparatus cooperating system of the present invention has been described above as handling, as music content, displaying music-piece-associated data, such as musical score data (musical score displaying data) and music-piece guiding illustration data, the electronic-audio-apparatus cooperating system of the present invention may handle, as music content, any other data, such as other displaying music-piece-associated data like lyrics data (lyrics displaying data), chord name displaying data, additional information and comment data, or non-displaying music-piece-associated data like chord progression (train) instruction data, accompaniment style data or corresponding MIDI data. The additional information represents, for example, creation date and hour, creator, name, category (genre), etc. of music content in question. Further, the comment data represent comments, notes, etc. of music content in question that are created in text, HTML, etc. and can be handled by the music content display apparatus. Further, examples of music content made usable in a game apparatus include BGM data, background image data, etc., and examples of music content made usable in a training apparatus include the above-mentioned music-piece guiding illustration data, additional information, comment data, etc. Furthermore, examples of music content made usable in a music piece data editing apparatus include the above-mentioned lyrics data, chord name displaying data, corresponding MIDI data, etc., and examples of music content made usable in an automatic accompaniment apparatus include the above-mentioned accompaniment style data, chord progression train instruction data, etc.

Further, the preferred embodiment of the electronic-audio-apparatus cooperating system of the present invention has been described above in relation to the case where examples of functions made usable based on function executing programs include a layout switching function, a printing function, a zoom switching function, etc. executed in the musical score display program that allows the electronic-audio-apparatus cooperating apparatus (DS) to function as a musical score display apparatus. However, in a recording program that allows the electronic-audio-apparatus cooperating apparatus (DS) to function as a recording device, recorded waveform data display, editing and storage functions are usable. Further, in a game program that allows the electronic-audio-apparatus cooperating apparatus (DS) to function as a game apparatus, various game functions activatable on the game program are usable. Further, in a training program that allows the electronic-audio-apparatus cooperating apparatus (DS) to function as a training apparatus, a performance tempo change function, a scoring function, etc. are usable. Furthermore, in a data editing apparatus that allows the electronic-audio-apparatus cooperating apparatus (DS) to function as a music piece data editing apparatus, an editing function, a storage function, a quantize function, a transpose function, etc. are usable. Furthermore, in an automatic accompaniment program that allows the electronic-audio-apparatus cooperating apparatus (DS) to function as an automatic accompaniment apparatus, an accompaniment style/section selection function, an accompaniment-part-by-accompaniment-part reproduction ON/OFF switching function, etc. are usable.

In the case where the electronic-audio-apparatus cooperating apparatus (DS) is a music content display apparatus (musical score display apparatus), a training apparatus or the like, the electronic-audio-apparatus cooperating apparatus (DS) may be constructed to be capable of receiving time information (Bn), such as a measure position, of music content as well as content identification information (Si) capable of identifying the music content as in the above-described preferred embodiment, the time information (Bn) can be used in music content displaying, training or the like. In such a case, the content identification information and time information of music content may be superposed either on a single audio signal or on separate audio signals.

Changing or updating to the usable state may be effected automatically, or only information that content or program has become updatable may be given to a user so that the user can perform an operation for giving an update instruction. In such a case, an update button may be displayed so that updating can be effected in response to a user's operation of the update button.

If the control information to be included in the audio signal can be formed as a trigger for making a determination as to whether an item or set of music content should be made usable or whether a function executing program should be made executable, the control information may be other than information capable of identifying a set of music content or a model of the electronic audio apparatus.

The preferred embodiment has been described above in relation to the case where the control information to be included in the audio signal is a score page turning signal output from the electronic audio apparatus (EM) at predetermined time intervals (e.g., every 0.5 seconds). However, this score page turning signal is used not only for executing an actual score page turning function, but also for the aforementioned first and second functions. Namely, the score page turning signal is also used for changing a set of music content (e.g., musical store data) in the non-usable state to the usable state.

A flag may be provided for determining whether all of sets of music content and/or all functions stored in the storage section (STd) are in the usable state (whether a predetermined reception condition has been cleared) so that they can be updated in accordance with a current state of the flag. In a case where all of sets of music content and/or all functions stored in the storage section (STd) are updated to the usable state in response to receipt of a predetermined signal, the flag may take any one of two states. However, in a case where sets of music content and/or functions are made usable in a stepwise fashion in accordance with levels of users and purchased models of cooperating-with electronic audio apparatus, there may be provided a variable indicative of which step (i.e., which group of sets of music contents and which group of functions) are usable so that updating to the usable state can be effected in accordance with a value of the variable.

If the user has purchased a plurality of types of electronic audio apparatus (EM) as cooperating targets, all sets of music content and functions, corresponding to the plurality of electronic audio apparatus purchased may be collectively set in the usable state, or sets of music content and function executing programs that are made usable or a combination of such sets of music content and function executing programs may be varied so that only sets of music content and functions of one electronic audio apparatus currently in an actual communicating state are placed in the usable state. Furthermore, model ID information, model series information, level information, etc. may be managed in association with a variable (STAFF in the preferred embodiment) indicative of whether a predetermined signal has been received.

Further, in preparation for communication with a plurality of types of electronic audio apparatus, a history of model ID information of electronic audio apparatus which the electronic-audio-apparatus cooperating apparatus has communicated with may be recorded. With such an arrangement, appropriate sets of music content and function executing programs corresponding to the plurality of types of electronic audio apparatus can be made usable and can be used with ease. Also, such an arrangement permits use of sets of music content and function executing programs specific to any desired one of the models of the electronic audio apparatus.

Furthermore, the present invention may be constructed in such a manner that, when sets of music content and/or function executing programs stored in the electronic-audio-apparatus cooperating apparatus (DS) has been updated to the usable state in response to a signal transmitted from the electronic audio apparatus (EM), any of the sets of music content or function executing programs having been updated to the usable state is automatically selected and executed (e.g., if what is automatically section is a set of music content, then any one of the functions may be automatically further selected and executed). For example, in a case where the electronic-audio-apparatus cooperating apparatus (DS) is a music content display apparatus, a first set of music content (i.e., set of music content (musical score display data) having the smallest ID value) of a plurality of sets of music content updated to the usable state may be automatically selected and displayed by default. Further, where the electronic-audio-apparatus cooperating apparatus (DS) is a game apparatus, a default one of games updated to the usable state is automatically selected and activated. The default may be one having the smallest ID value or latest creation date and hour in the electronic-audio-apparatus cooperating apparatus (DS), or a condition for determining the default may be set by the user.

Further, updating a function executing program to the usable state means that a function having been updated to the usable state in the electronic-audio-apparatus cooperating apparatus DS becomes selectable and executable through a user's operation. Alternatively, when music content (musical score) is to be displayed in the case where the electronic-audio-apparatus cooperating apparatus (DS) is the music content display apparatus (musical score display apparatus), the musical score display itself is performed irrespective of receipt of control information Cs from the electronic audio apparatus EM, but, when the music content is to be displayed after the receipt of the control information Cs, an internal function (e.g., a part of a certain function) that does not appear on the user I/F, such as a function for displaying one page of the musical score in an automatically reduced size such that the screen need not be scrolled. For example, in such a case, ON/OFF of the function may be managed internally in accordance with information of a flag or the like.

This application is based on, and claims priorities to, JP PA No. 2011-208308 filed on 25 Sep. 2011 and JP PA No. 2012-157935 filed on 13 Jul. 2012. The disclosure of the priority applications, in its entirety, including the drawings, claims, and the specification thereof, are incorporated herein by reference.

What is claimed is:

1. An apparatus operating in cooperation with an external electronic audio apparatus, comprising:

a storage section storing therein one or more sets of music content, at least a part of the one or more sets of music content being set in a non-usable state at least in an initial state;

a reception section configured to receive a signal, which includes a tone signal portion representing music piece data, performance data, or both the music piece data and the performance data and a control signal portion, transmitted by the external electronic audio apparatus;

a determination section configured to determine whether the control signal portion of the signal received by said reception section satisfies a predetermined condition; and a state update section configured to, when said determination section has determined that the control signal portion of the signal satisfies the predetermined condition, update, to a usable state, at least a part of the sets of music content, stored in said storage section, that is currently set in the non-usable state.

2. The apparatus as claimed in claim 1, wherein said reception section receives, from the electronic audio apparatus, an audio signal carrying additional information, and said determination section extracts the additional information from the audio signal received by said reception section, and determines, on the basis of the extracted additional information, whether the received audio signal satisfies the predetermined condition.

3. The apparatus as claimed in claim 2, wherein the additional information includes at least content identification information capable of identifying music content, and which further comprises a control section configured to read out, from said storage section, music content identified by the content identification information included in the additional information extracted from the received audio signal.

4. The apparatus as claimed in claim 1, wherein, when said determination section has determined that the control signal portion of the signal satisfies the predetermined condition, said state update section effects updating of the music content such that all of the sets of content stored in said storage section and associated with the electronic audio apparatus are placed in the usable state.

5. The apparatus as claimed in claim 2, wherein the additional information includes at least model identification information capable of identifying a model of the electronic audio apparatus, and wherein, when said determination section has determined that the control signal portion of the signal satisfies the predetermined condition, said state update section effects updating of the music content such that any of the sets of content, stored in said storage section, that is associated with the electronic audio apparatus identified by the model identification information is placed in the usable state.

6. The apparatus as claimed in claim 1, wherein said storage section stores therein one or more function executing programs, at least a part of the one or more function executing programs stored in said storage section being set in a non-usable state at least in an initial state, and wherein, when said determination section has determined that the control signal portion of the signal satisfies the predetermined condition, said state update section updates, to a usable state, at least a part of the function executing programs, stored in said storage section, that is currently set in a non-usable state.

7. A computer-implemented method for, in cooperation with an external electronic audio apparatus, making usable music content stored in a storage section, at least a part of one or more sets of music content stored in said storage section being set in a non-usable state at least in an initial state, said method comprising:

a reception step of receiving a signal, which includes a tone signal portion representing music piece data, performance data, or both the music piece data and the performance data and a control signal portion, transmitted by the external electronic audio apparatus;

a determination step of determining whether the control signal portion of the signal received by said reception step satisfies a predetermined condition; and a step of, when said determination step has determined that the control signal portion of the signal satisfies the predetermined condition, updating, to a usable state, at least a part of the sets of music content, stored in said storage section, that is currently set in a non-usable state.

8. A non-transitory computer-readable medium containing a program executable by a computer to perform a method for, in cooperation with an external electronic audio apparatus, making usable music content stored in a storage section, at least a part of one or more sets of music content stored in said storage section being set in a non-usable state at least in an initial state, said method comprising:

a reception step of receiving a signal, which includes a tone signal portion representing music piece data, performance data, or both the music piece data and the performance data and a control signal portion, transmitted by the external electronic audio apparatus;

a determination step of determining whether the control signal portion of the signal received by said reception step satisfies a predetermined condition; and an update step of, when said determination step has determined that the control signal portion of the signal satisfies the predetermined condition, updating, to a usable state, at least a part of the sets of music content, stored in said storage section, that is currently set in a non-usable state.

9. The medium as claimed in claim 8, wherein said reception step receives, from the electronic audio apparatus, an audio signal carrying additional information, and said determination step extracts the additional information from the audio signal received by said reception step, and determines, on the basis of the extracted additional information, whether the received audio signal satisfies the predetermined condition.

10. The medium as claimed in claim 9, wherein the additional information includes at least content identification information capable of identifying music content, and which further comprises a step of reading out, from the storage section, music content identified by the content identification information included in the additional information extracted from the received audio signal.

11. The medium as claimed in claim 8, wherein, when said determination step has determined that the control signal portion of the signal satisfies the predetermined condition, said update step effects updating of the music content such that all of sets of content stored in the storage section and associated with the electronic audio apparatus are placed in the usable state.

12. The medium as claimed in claim 9, wherein the additional information includes at least model identification information capable of identifying a model of the electronic audio apparatus, and wherein, when said determination step has determined that the control signal portion of the signal satisfies the predetermined condition, said update step effects updating of the music content such that any of the sets of content, stored in the storage section, that is associated with the electronic audio apparatus identified by the model identification information is placed in the usable state.

13. The medium as claimed in claim 8, wherein the storage section stores therein one or more function executing programs, at least a part of the one or more function executing programs stored in the storage section being set in a non-usable state at least in an initial state, and wherein, when said determination step has determined that the control signal portion of the signal satisfies the predetermined condition, said update step updates, to a usable state, at least a part of the function executing programs, stored in said storage section, that is currently set in a non-usable state.

14. An apparatus operating in cooperation with an external electronic audio apparatus, comprising:

a storage section storing therein one or more function executing programs, at least a part of the one or more function executing programs being set in a non-usable state at least in an initial state;

a reception section configured to receive a signal, which includes a tone signal portion representing music piece data, performance data, or both the music piece data and the performance data and a control signal portion, transmitted by the external electronic audio apparatus;

a determination section configured to determine whether the control signal portion of the signal received by said reception section satisfies a predetermined condition; and a state update section configured to, when said determination section has determined that the control signal portion of the signal satisfies the predetermined condition, update, to a usable state, at least a part of the function executing programs, stored in said storage section, that is currently set in the non-usable state.

15. The apparatus as claimed in claim 14, wherein said reception section receives, from the external electronic audio apparatus, an audio signal carrying additional information, and said determination section extracts the additional information from the audio signal received by said reception section, and determines, on the basis of the extracted additional information, whether the received audio signal satisfies the predetermined condition.

16. The apparatus as claimed in claim 14, wherein, when said determination section has determined that the control signal portion of the signal satisfies the predetermined condition, said state update section effects updating of the function executing program such that all of the function executing programs stored in said storage section and associated with the electronic audio apparatus are placed in the usable state.

17. The apparatus as claimed in claim 15, wherein the additional information includes at least model identification information capable of identifying a model of the electronic audio apparatus, and wherein, when said determination section has determined that the control signal portion of the signal satisfies the predetermined condition, said state update section effects updating of the function executing program such that any of the one or more function executing programs, stored in said storage section, that is associated with the electronic audio apparatus of the model identified by the model identification information is placed in the usable state.

18. A computer-implemented method for, in cooperation with an external electronic audio apparatus, making usable a function executing program stored in a storage section, at least a part of one or more function executing programs stored in said storage section being set in a non-usable state at least in an initial state, said method comprising:

a reception step of receiving a signal, which includes a tone signal portion representing music piece data, performance data, or both the music piece data and the performance data and a control signal portion, transmitted by the external electronic audio apparatus;

a determination step of determining whether the control signal portion of the signal received by said reception step satisfies a predetermined condition; and a step of, when said determination step has determined that the control signal portion of the signal satisfies the predetermined condition, updating, to a usable state, at least a part of the function executing programs, stored in said storage section, that is currently set in the non-usable state.

19. A non-transitory computer-readable medium containing a program executable by a computer to perform a method for, in cooperation with an external electronic audio apparatus, making usable a function executing program stored in a storage section, at least a part of one or more function executing programs stored in said storage section being set in a non-usable state at least in an initial state, said method comprising:

a reception step of receiving a signal, which includes a tone signal portion representing music piece data, performance data, or both the music piece data and the performance data and a control signal portion, transmitted by the external electronic audio apparatus;

a determination step of determining whether the control signal portion of the signal received by said reception step satisfies a predetermined condition; and a step of, when said determination step has determined that the control signal portion of the signal satisfies the predetermined condition, updating, to a usable state, at least a part of the function executing programs, stored in said storage section, that is currently set in the non-usable state.

20. The medium as claimed in claim 19, wherein said reception step receives, from the electronic audio apparatus, an audio signal carrying additional information, and said determination step extracts the additional information from the audio signal received by said reception step, and determines, on the basis of the extracted additional information, whether the received audio signal satisfies the predetermined condition.

21. The medium as claimed in claim 19, wherein, when said determination step has determined that the control signal portion of the signal satisfies the predetermined condition, said update step effects updating of the function executing program such that all of the function executing programs stored in the storage section and associated with the electronic audio apparatus are placed in the usable state.

22. The medium as claimed in claim 20, wherein the additional information includes at least model identification information capable of identifying a model of the electronic audio apparatus, and wherein, when said determination step has determined that the control signal portion of the signal satisfies the predetermined condition, said update step effects updating of the function executing program such that any of the one or more function executing programs, stored in the storage section, that is associated with the electronic audio apparatus of the model identified by the model identification information is placed in the usable state.

* * * * *